United States Patent
Ohta et al.

(10) Patent No.: US 9,094,201 B2
(45) Date of Patent: *Jul. 28, 2015

(54) TRANSMISSION CONTROLLING METHOD, SENDER APPARATUS AND RECEIVER APPARATUS FOR WIRELESS COMMUNICATION SYSTEM

(71) Applicant: FUJITSU LIMITED, Kawasaki-shi, Kanagawa (JP)

(72) Inventors: Yoshiaki Ohta, Kawasaki (JP); Kazuhisa Obuchi, Kawasaki (JP); Kazuo Kawabata, Kawasaki (JP); Yoshihiro Kawasaki, Kawasaki (JP); Yoshiharu Tajima, Kawasaki (JP); Hideto Furukawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/741,815

(22) Filed: Jan. 15, 2013

(65) Prior Publication Data

US 2013/0129002 A1  May 23, 2013

Related U.S. Application Data

(63) Continuation of application No. 12/424,642, filed on Apr. 16, 2009, which is a continuation of application No. PCT/JP2006/321552, filed on Oct. 27, 2006.

(51) Int. Cl.
*H04L 1/18* (2006.01)
*H04B 7/06* (2006.01)
(Continued)

(52) U.S. Cl.
CPC ............ *H04L 1/1812* (2013.01); *H04B 7/0689* (2013.01); *H04L 1/06* (2013.01);
(Continued)

(58) Field of Classification Search
CPC ......... H04B 7/0689; H04J 15/00; H04L 1/06; H04L 1/185; H04L 1/1812; H04L 1/1816; H04L 1/1822; H04L 1/0072; H03M 13/6356

USPC .................. 714/745–751, 754, 757, 766, 768
See application file for complete search history.

(56) References Cited

U.S. PATENT DOCUMENTS 5,367,681 A   11/1994   Foss et al.
5,799,245 A    8/1998   Ohashi
(Continued)

FOREIGN PATENT DOCUMENTS

CN      1815939       8/2006
JP      2004-527979   9/2004
(Continued)

OTHER PUBLICATIONS

Interrogation issued for corresponding Japanese Patent Application No. 2008-540867 (appeal No. 2012-3310), mailed Oct. 30, 2012, with English translation.

(Continued)

*Primary Examiner* — Nadeem Iqbal
(74) *Attorney, Agent, or Firm* — Myers Wolin, LLC

(57) ABSTRACT

A wireless communication system including a sender apparatus having a plurality of transmitting antennas that performs MIMO transmission of a plurality of data blocks; and a receiver apparatus that receives the plurality of data blocks. The sender apparatus transmits a process number via a control channel different from a data channel to the receiver apparatus, and wherein when the MIMO diversity transmission is performed, the receiver apparatus performs HARQ processing in the received data blocks based on not a process number which prevents the data blocks from competing but the received process number from the sender apparatus.

4 Claims, 32 Drawing Sheets

(51) Int. Cl.
    *H04L 1/06*      (2006.01)
    *H04L 1/16*      (2006.01)
    *H04J 99/00*     (2009.01)
(52) U.S. Cl.
    CPC ............ *H04L 1/1671* (2013.01); *H04L 1/1822*
          (2013.01); *H04L 1/1845* (2013.01); *H04J 15/00*
                    (2013.01); *H04L 1/1816* (2013.01)

(56) References Cited

U.S. PATENT DOCUMENTS

| | | | |
|---|---|---|---|
| 7,310,336 | B2 | 12/2007 | Malkamaki |
| 7,684,362 | B2 | 3/2010 | Higuchi et al. |
| 8,416,872 | B2 * | 4/2013 | Higuchi et al. ............... 375/267 |
| 8,601,336 | B2 * | 12/2013 | Ohta et al. |
| 8,738,980 | B2 * | 5/2014 | Ohta et al. |
| 8,806,286 | B2 * | 8/2014 | Ohta et al. |
| 8,832,514 | B2 * | 9/2014 | Ohta et al. |
| 2002/0172208 | A1 | 11/2002 | Malkamaki |
| 2003/0003937 | A1 | 1/2003 | Ohkubo et al. |
| 2003/0131124 | A1 * | 7/2003 | Yi et al. |
| 2004/0114529 | A1 * | 6/2004 | Dong-Hi et al. ............... 370/249 |
| 2005/0181737 | A1 | 8/2005 | Kobayashi et al. |
| 2006/0114813 | A1 | 6/2006 | Seki et al. |
| 2006/0209813 | A1 | 9/2006 | Higuchi et al. |
| 2006/0223449 | A1 * | 10/2006 | Sampath et al. |
| 2007/0253508 | A1 | 11/2007 | Zhou et al. |
| 2009/0213955 | A1 | 8/2009 | Higuchi et al. |
| 2010/0275083 | A1 * | 10/2010 | Nam et al. .................... 714/748 |
| 2011/0243265 | A1 | 10/2011 | Dateki et al. |
| 2012/0176957 | A1 * | 7/2012 | Chen et al. .................... 370/315 |
| 2012/0250776 | A1 * | 10/2012 | Ohta et al. .................... 375/259 |
| 2012/0307763 | A1 | 12/2012 | Dateki et al. |
| 2013/0016686 | A1 * | 1/2013 | Li et al. ........................ 370/329 |
| 2013/0039435 | A1 | 2/2013 | Dateki et al. |
| 2013/0129003 | A1 * | 5/2013 | Ohta et al. .................... 375/267 |

FOREIGN PATENT DOCUMENTS

| | | |
|---|---|---|
| JP | 2004304760 | 10/2004 |
| JP | 2006-173806 | 6/2006 |
| JP | 2006-173834 | 6/2006 |
| JP | 2006287551 | 10/2006 |
| WO | 2004091129 | 10/2004 |
| WO | 2005004376 | 1/2005 |
| WO | 2006/106613 | 10/2006 |

OTHER PUBLICATIONS

NTT DoCoMo, NEC, Sharp; "AMC and HARQ Using Frequency Domain Channel-dependent Scheduling in MIMO Channel Transmission"; Agenda Item: 10.5.2; 3GPP TSG RAN WG1 #42 on LTE; R1-050942; London, UK; Aug. 29-Sep. 2, 2005.
Philips; "HS-SCCH signalling for Rel-7 FDD MIMO scheme"; Agenda Item: 7.1; 3GPP TSG RAN WG1 Meeting #46; Tdoc R1-061953; Tallinn, Estonia; Aug. 28-Sep. 1, 2006.
The extended European search report including the supplementary European search report and the European search opinion, issued for corresponding European Patent Application No. 06822513.5, dated Dec. 11, 2012.
Qualcomm Europe; "HS-SCCH in support of D-TxAA"; Agenda item: 7.1; 3GPP TSG-RAN WG1 #46; R1-062032; Tallin, Estonia; Aug. 28-Sep. 1, 2006.
Nokia; "Signalling needs for MIMO in UTRA"; Agenda item: 7.1—MIMO in UTRA; 3GPP TSG-RAN WG1 Meeting #46; R1-062246; Aug. 28-Sep. 1, 2006.
Notice of Reason for Rejection issued for corresponding Japanese Patent Application No. 2008-540867, dispatched Apr. 9, 2013 with English translation.
Korean Intellectual Property Office "Notice of Preliminary Rejection" issued for corresponding Korean Patent Application No. 10-2009-7008356, mailed Apr. 5, 2011. English translation attached.

TTA Standard, TTA.KO-06.0082/R1, "Specifications for 2.3GHz band Portable Internet Service" Physical & Medium Access Control Layer, Telecommunications Technology Association, dated Dec. 21, 2005. English translation attached. [Ref.: KROA mailed 4.5.11].
3GPP TSG-RAN WG1 #44 R1-060459, "Implications of MCW MIMO on DL HARQ" Qualcomm Europe, Denver, USA, Feb. 13-17, 2006.
3GPP TR 25.913 V7.3.0 3rd Generation Partnership Project; Technical Specification Group Radio Access Network; Requirements for Evolved UTRA (E-UTRA) and Evolved UTRAN (E-UTRAN) (Release 7), Mar. 2006.
"Improving MIMO throughput with per-antenna rate control (PARC)," Lucent Technologies, R1-01-0941, RAN WG1 #21, Turino, Italy, Aug. 2001.
3GPP TSG RAN WG1 TSG-R1 (03) 0806 Per Stream Rate Control with Code Reuse TxAA and APP Decoding for HSDPA, Lucent Technologies, New York, USA, Aug. 2003.
3GPP TR 25.814 V7.0.0 3rd Generation Partnership Project; Technical Specification Group Radio Access Network; Physical layer aspects for evolved Universal Terrestrial Radio Access (UTRA) (Release 7), Jun. 2006.
3GPP TSG RAN WG1 Meeting #45, R1-061327, "TP on HARQ," Samsung, Shanghai, China, May 8-12, 2006.
International Search Report of Japanese Patent Office, International Application No. PCT/JP03/08297, completed Aug. 25, 2003.
International Search Report of Japanese Patent Office, for corresponding International Application No. PCT/JP2006/321552, completed Nov. 13, 2006.
A Non-Final Office Action, issued by the United States Patent and Trademark Office for corresponding U.S. Appl. No. 12/424,642, dated Feb. 9, 2012.
Office Action issued for corresponding Japanese Patent Application No. 2012-035003, mailed Jul. 23, 2013, with English translation.
Office Action issued for corresponding Japanese Patent Application No. 2012-035004, mailed Jul. 16, 2013, with English translation.
Extended European search report and the European search opinion issued for corresponding European Patent Application No. 13165692.8, dated Jul. 15, 2013.
NOKIA: "HARG overhead issues", Agenda item: 10.2, Enhanced Uplink DCH—HARQ, Aug. 25-29, 2003, R1-030733, TSG-RAN WG1 #33 meeting, 3rd Generation Partnership Project (3GPP), New York, USA.
Frodigh et al., "Future-Generation Wireless Networks", vol. 8, No. 5, pp. 10-17, Oct. 1, 2001, IEEE Personal Communications, IEEE Communications Society, US.
NOKIA: "Hybrid ARQ scheme for HSDPA", Agenda item: AH32, Nov. 5-7, 2001, TSGR1-01-1023, 3GPP TSG-RAN HSDPA AdHoc, 3rd Generation Partnership Project (3GPP), Sophia Antipolis, France.
Non-Final Office Action issued by the United States Patent and Trademark Office for corresponding U.S. Appl. No. 12/424,642, electronically delivered on Jun. 19, 2013.
Non-Final Office Action issued by the United States Patent and Trademark Office for corresponding U.S. Appl. No. 13/741,820 electronically delivered on Jul. 2, 2013.
Non-Final Office Action issued by the United States Patent and Trademark Office for corresponding U.S. Appl. No. 13/493,529, electronically delivered on Jul. 22, 2013.
First Notification of Office Action issued for corresponding Chinese Application No. 201110185617.1, issued Apr. 22, 2013.
Non-Final Office Action issued by the United States Patent and Trademark Office for corresponding U.S. Appl. No. 13/493,535 electronically delivered on Sep. 9, 2013.
Final Office Action issued by the United States Patent and Trademark Office for corresponding U.S. Appl. No. 13/493,529, electronically delivered on Dec. 24, 2013.
Final Office Action issued by the United States Patent and Trademark Office for corresponding U.S. Appl. No. 13/493,535, electronically delivered on Dec. 24, 2013.
Office Action issued for corresponding European Patent Application No. 13 165 692.8, dated Mar. 21, 2013.

(56) References Cited

OTHER PUBLICATIONS

Philips, "Fallback mode for Rel-7 FDD MIMO scheme", Agenda Item: 7.1, Aug. 28-Sep. 1, 2006, R1-061952, 3GPP TSG RAN WG1 Meeting #46, 3rd GENERATION PARTNERSHIP PROJECT (3GPP), Tallinn, Estonia.
Non-Final Office Action corresponding to U.S. Appl. No. 13/424,642, electronically delivered Feb. 7, 2014.
Brief Communication issued for corresponding European Patent Application No. 06822513.5 dated Sep. 10, 2014.
Notice of Preliminary Rejection issued for corresponding Korean Patent Application No. 10-2013-2013-7025832 mailed on Sep. 26, 2014 with an English translation.
Notice of Preliminary Rejection issued for corresponding Korean Patent Application No. 10-2013-7025835 mailed on Sep. 26, 2014 with an English translation.
Office Action issued for corresponding Australian Patent Application No. 2014202774 issued Feb. 27, 2015.
Notice of Final Rejection issued for corresponding Korean Patent Application No. 10-2013-7025832 mailed on Mar. 20, 2015.
Notice of Final Rejection issued for corresponding Korean Patent Application No. 10-2013-7025835 mailed on Mar. 20, 2015.
Office Action issued for corresponding European Patent Application No. 1316592.8 issued Feb. 9, 2015.
Office Action issued for corresponding European Patent Application No. 13165700.9 issued Feb. 9, 2015.
Office Action issued for corresponding Japanese Patent Application No. 2014-118269 issued Feb. 17, 2015 with a partial English translation.

* cited by examiner

TRANSMISSION CONTROLLING METHOD, SENDER APPARATUS AND RECEIVER APPARATUS FOR WIRELESS COMMUNICATION SYSTEM

CROSS-REFERENCE TO RELATED APPLICATION(S)

This application is a continuation of U.S. application Ser. No. 12/424,642, filed Apr. 16, 2009, now pending, which is a continuation of International Application No. PCT/JP2006/321552, filed on Oct. 27, 2006 in Japan, the entire contents of each are herein wholly incorporated by reference. The present application also relates to U.S. application Ser. No. 13/493,529, filed Jun. 11, 2012, now pending and U.S. application Ser. No. 13/493,535, filed Jun. 11, 2012, now pending.

TECHNICAL FIELD

The present invention relates to a transmission controlling method, a sender apparatus and a receiver apparatus for a wireless communication system, and particularly to a technique suitable for use with a re-sending controlling technique in MIMO (Multi Input Multi Output) transmission.

BACKGROUND ART

While, regarding a mobile communication system such as a portable telephone system, a service of the third generation method according to a CDMA (Code Division Multiple Access) method has been started already, investigations of a next generation mobile communication system capable of implementing higher-speed communication on the basis of an OFDMA (Orthogonal Frequency Division Multiple Access) method are proceeding (refer to Non-Patent Document 1 hereinafter described).

Therefore, the MIMO as a technique for increasing the transmission rate has been proposed as a reliable technique. An outline of a MIMO transmission system is depicted in FIG. 19. The MIMO transmission system depicted in FIG. 19 includes a sender apparatus 100 having a plurality of sending antennas (antenna systems) Tx#1, Tx#2, . . . , and Tx#n (n is an integer of 2 or more) and a receiver apparatus 200 having a plurality of receiving antennas (antenna systems) Rx#1, Rx#2, . . . , and Rx#n, MIMO is a spatial multiplex transmission technique wherein different data streams are set in parallel from the sending antennas Tx#i (i=1~n) to increase the transmission capacity in proportion to the number n of the sending antennas. The different sending antennas Tx#i are disposed so as not to have correlation with each other, and the data streams sent from the sending antennas Tx#i individually pass along fading propagation paths independent of each other and are received by the receiving antennas Rx#i in a spatially mixed state with other different data streams.

As an implementation example of such a MIMO transmission system as described above, for example, as depicted in FIG. 20, a method is available wherein a stream process is carried out independently for each antenna. For example, PARC (Per Antenna Rate Control) wherein pre-coding (Pre-coding) is not carried out (refer to Non-Patent Document 2 hereinafter described), PSRC (Per Stream Rate Control) wherein pre-coding is carried out (refer to Non-Patent Document 3 hereinafter described) and so forth are available.

In particular, the system depicted in FIG. 20 includes, for example, the sender apparatus 100 and the receiver apparatus 200. The sender apparatus 100 includes, for example, a stream separation section 101, a CRC addition section 102 and a coding section 103 as well as a HARQ processing section 104 for each sending stream, a sending section 105 and a re-sending controlling section 106. And the receiver apparatus 200 includes, for example, a signal separation and synthesis section 201, a HARQ processing section 202 and a CRC calculation section 203 for each received stream, an ACK/NACK decision section 204 and a stream synthesis section 205. It is to be noted that a reference character ATR represents a receiving antenna of the sender apparatus 100 and another reference character ATT represents a sending antenna of the receiver apparatus 200, and, in the present example, it is represented for the convenience of illustration that an ACK/NACK (Acknowledgement/Negative Acknowledgement) signal (acknowledgment signal) is sent from the sending antenna ATT and received by the receiving antenna ATR.

Then, the sender apparatus (hereinafter referred to sometimes as sender side) 100 operates, for example, in accordance with a flow chart depicted in FIG. 21, and the receiver apparatus (hereinafter referred to sometimes as receiver side) 200 operates, for example, in accordance with a flow chart depicted in FIG. 22.

In particular, in the sender apparatus 100, sending data are separated into sending streams of the antenna systems Tx#i by the stream separation section 101 (step A1) and CRC (Cyclic Redundant Check) codes for error detection are added to each of the sending streams of the antenna systems Tx#i by the CRC addition section 102 (step A2), and coding of the data streams is carried out for bit error correction by the coding section 103 and a HARQ (Hybrid Automatic Repeat request) process is carried out for re-sending control by the HARQ processing section 104 (step A4). Then, a sending antenna Tx#i for sending a HARQ block (process) is selected by the sending section 105, and the HARQ block is modulated and then sent to the receiver apparatus 200. Here, while, where pre-coding is used (in case of yes at step A5), each process can select a plurality of sending antennas Tx#i, in case of the PARC (in case of no at step A5), each process is sent from a sending antenna Tx#i determined in advance.

On the other hand, in the receiver apparatus 200, as depicted in FIG. 22, if a signal sent from the sender apparatus 100 is received by the receiving antennas Rx#i, then separation and synthesis of the received signals is carried out by the signal separation and synthesis section 201 (step B1), and it is decided whether or not each of the received signals (processes) is a re-sent process (step B2). As a result, if the received signal is a re-sent process (in case of yes at step B2), then the receiver apparatus 200 synthesizes the signal received in the present reception cycle and a received signal of the same process received and stored in the preceding reception cycle by means of the HARQ processing section 202 (step B3), and checks CRC codes added to each process by means of the CRC calculation section 203 to detect bit errors (step B4). It is to be noted that, where the process received in the present reception cycle is not a re-sent process (in case of no at step B2), synthesis by the HARQ process section 202 is not carried out but bit error detection by the CRC calculation section 203 is carried out (step B4).

Then, if a bit error is detected by the ACK/NACK decision section 204 (in case of yes at step B5), then the received process is retained and a NACK signal is sent as a reply to the sender apparatus 100 through the sending antenna ATT (step B6), but, if no bit error is detected (in case of no at step B5), then an ACK signal is sent as a reply to the sender apparatus 100 through the sending antenna ATT and the process is passed to an upper layer (step B7). It is to be noted that the received signals of the streams from which no error is detected are synthesized finally by the stream synthesis section 205 and then outputted.

In such series of processes as described above, an important function for high-speed communication is the HARQ. The HARQ is an ARQ method which is a combination of automatic re-sending request (ARQ) and error correction coding (FEC: Forward Error Correction). In particular, on the sender side 100, a block of information bits is error correction coded with a parity bit for error detection added, and all or some of the codes. If re-sending occurs, then all or some of coding bits of the current block are sent.

On the receiver side 200, the synthesis process is carried out for individually corresponding bits of an existing block to a re-sent block, and error correction and error detection process are carried out again using the synthesis block obtained as a result of the synthesis process. In this manner, the receiver side 200 repetitively carries out ACK/NACK reply sending to the sender side 100 and trial of a decoding process by re-sending until block errors are eliminated within a range of a predetermined number of times as an upper limit.

In the next generation mobile communication, particularly an N-channel Stop-and-Wait ARQ is applied (refer to Non-Patent Document 4 hereinafter described). Here, N represents an integer and represents the number of blocks (number of processes) which can be sent at the same time. For each of processes sent at the same time, re-sending control by the Stop and Wait is carried out.

An outline of the N-channel Stop-and-Wait ARQ is illustrated in FIG. 23.

Each process is sent within a unit interval of wireless transmission (TTI: Transmission Time Interval) and is identified with an identifier given as a process number N. In the case of FIG. 23, the process number N is N=5 (0~4), and accordingly, the case of FIG. 23 corresponds to a case of 5-channel Stop-and-Wait ARQ. It is to be noted that, while it is depicted in FIG. 23 that a process number is added to the data part of each process for the convenience of illustration, actually a process number is sent with a controlling channel and no process number is added to the data part of each process. In particular, a process number is annexed to and sent together with the data part of each process (this similarly applies to the following description).

If the receiver apparatus 200 receives a process from the sender apparatus 100, then it carries out error detection in such a manner as described above. Here, if an error occurs with processes [1], [3] and [4] but no error occurs with processes [0] and [2], then regarding the processes [0] and [2] with which no error occurs, an ACK signal is sent as a reply to the sender apparatus 100, but regarding the processes [1], [3] and [4] with which an error occurs, a NACK signal is sent as a reply to the sender apparatus 100 after they are retained into a memory (not depicted). While also a reply of the ACK/NACK signal is sent with the controlling channel, in this instance, the process number need not be sent back.

The receiver apparatus 200 adjusts the reply sending timing for each process and sends the ACK/NACK signal as a reply so that the sender apparatus 100 can identify to which process the ACK/NACK signal responds. Although, if the sender apparatus 100 receives an ACK signal, then sending of a new process is carried out, at this time, a process number which is not used in five processes in the past may be added arbitrarily including time at which the process number is added (in FIG. 23, process numbers which are not used are added in an ascending order).

On the other hand, although, if the sender apparatus 100 receives a NACK signal, then re-sending of a process with which an error occurs is carried out, at this time, a process number same as the process number in the preceding cycle is added. After the re-sending, the receiver apparatus 200 recognizes the process number to decide with which process the received process should be synthesized. In particular, if the processes [1], [3] and [4] which are re-sent processes are received, then the received processes [1], [3] and [4] are packet-synthesized with the processes [1], [2] and [3], respectively, which individually have process numbers same as those retained upon NACK signal sending in the preceding cycle. After the synthesis, the CRC codes are checked, and if the processes are successfully received correctly, then the ACK is sent as a reply to the sender apparatus 100. On the other hand, if an error occurs, then the process after the synthesis is retained and the NACK signal is sent as a reply again to the sender apparatus 100.

It is to be noted that, while two types of representative methods are available as a synthesis method, any of the synthesis methods may be utilized in the present invention. One of the synthesis methods is a type of a synthesis method wherein data fully same as that upon former sending is re-sent upon re-sending and a received signal upon former sending and another received signal upon re-sending are synthesized with each other to carry out production of data to be decoded, and the other one of the synthesis methods is a type of a synthesis method wherein a puncturing pattern of data after coding is changed upon re-sending to send bits which are not sent till then and a received signal upon former sending and another received signal upon re-sending are synthesized with each other to decrease the equivalent coding ratio so that the error correction capacity (coding gain) is enhanced. The latter technique is called IR (Incremental Redundancy).

Such process processing as described above is carried out in a similar manner irrespective of difference of the PARC or the pre-coding. Therefore, description is continuously given below taking the PARC as an example.

A manner of the N-channel Stop-and-Wait ARQ where the sender apparatus 100 and the receiver apparatus 200 are ready for the PARC is illustrated in FIG. 24.

Since the CRC addition, coding and HARQ processes are carried out independently for each antenna in the PARC as described above, an independent number is added also as a HARQ process number. In FIG. 24, a manner (refer to arrow marks of broken lines) is illustrated wherein re-sending occurs with the processes [1], [3] and [4] sent from the sending antenna Tx#1 and with the process [1] sent from the sending antenna Tx#2. In such a case as just described, since the HARQ is carried out for each antenna system as described above, re-sending control is carried out independently for each antenna system. It is to be noted that an addition method of the process number is carried out in accordance with a rule similar to that in FIG. 23.

Further, in the MIMO transmission in the next generation mobile communication system, in order to allow data signals sent from the different sending antennas Tx#i to be separated and synthesized among the sending antennas Tx#i, the sender apparatus 100 sends an antenna identification signal (for example, a pilot signal or a scrambling code).

An example of pilot signal addition where the two sending antennas of the sender apparatus 100 are used is depicted in FIG. 25. As depicted in (1) and (2) of FIG. 25, the pilot signal (R: Reference Symbol) is added in the same time series but in different frequency series between the antenna systems Tx#1 and Tx#2. The receiver apparatus 200 refers to the pilot signal to separate a signal of the antenna system Tx#1 from the received signal by the antenna system Rx#1 of the receiver apparatus 200 and separates a signal of the antenna system Tx#2 from the received signal by the antenna systems Rx#2 of the receiver apparatus 200, and then synthesizes the separated signals with each other to restore the sent stream (process). Further, association between the antenna systems and the pilot signals is sent with notification information.

Non-Patent Document 1: "3GPP TR25.913 V7.3.0 Requirements for Evolved UTRA (E-UTRA) and Evolved UTRAN (E-UTRAN) (Release 7)," 3GPP (France), 2006-03

Non-Patent Document 2: Lucent, "Improving MIMO throughput with per-antenna rate control (PARC)," 3GPP (France), 2001-08

Non-Patent Document 3: Lucent, "Per Stream Rate Control with Code Reuse TxAA and APP Decoding for HSDPA," 3GPP (France), 2002-09

Non-Patent Document 4: "3GPP TR25.814 V7.4.0 Physical Layer Aspects for evolved Universal Terrestrial Radio Access (UTRA) (Release 7)," 3GPP (France), 2006-06

DISCLOSURE OF THE INVENTION

Subject to be Solved by the Invention

As a communication environment to which the MIMO transmission system is applied, for example, such a cell configuration as depicted in FIG. 26 is available. In particular, the cell configuration depicted in FIG. 26 is a form wherein one cell is divided into areas depending upon the form of the MIMO transmission, and where a mobile station 400 exists in an area (MIMO multiplex transmission area) 302 on the inside of the base station 300 as depicted in (1) of FIG. 26, the MIMO multiplex transmission (in (1) of FIG. 26, sent with 2 streams) is used. However, where the mobile station 300 exists in an area (non-MIMO multiplex transmission area) 303 on the outside of the base station 300, non-MIMO multiplex transmission (in (1) of FIG. 26, 1-stream transmission) is used. It is to be noted that the "non-MIMO multiplex transmission" signifies MIMO diversity transmission or MIMO single transmission wherein sending and reception of one stream are carried out with one antenna.

Further, as depicted in (2) of FIG. 26, where, even in the MIMO multiplex transmission area 302, the mobile station 400 is within an area 301 in the proximity of the base station 300 and line-of-sight communication is available, also there is a case wherein non-MIMO multiplex transmission (1-stream transmission in (2) of FIG. 26) is carried out on purpose. This is because, in the case of the line-of-sight communication, since an inter-antenna correlation occurs, there is the possibility that separation and synthesis of signals by the receiver apparatus 200 may be difficult and a high throughput cannot be obtained.

In such a case as just described, there is the possibility that, even if the mobile station 400 is in the area 301 in the proximity of the base station 300, a higher throughput may be obtained if not the MIMO multiplex transmission but non-MIMO multiplex transmission is carried out with a high degree of modulation and a high coding ratio.

In this manner, the MIMO multiplex transmission is applied not fixedly in 1 cell, but non-MIMO multiplex transmission is sometimes applied depending upon the existing position of the mobile station 400. For example, the MIMO multiplex transmission is carried out where the wireless quality (for example, an average value of the SN ratio with which the mobile station 400 reports to the base station 300) of the mobile station 400 is higher than a certain threshold value, but non-MIMO multiplex transmission is carried out where the wireless quality is lower than the threshold value.

At this time, since the number of streams decreases from plural streams to one stream, in the method wherein a process number is added independently for each antenna system, for example, like the PARC, when the number of streams decreases, the possibility occurs that communication cannot be continued because process numbers of the HARQ overlap (compete) with each other.

For example, an example of operation where the transmission mode is changed over from the MIMO multiplex transmission to the MIMO diversity transmission in the PARC is illustrated in FIG. 27. The example indicates a case wherein the ACK/NACK signal is sent as a reply with one stream.

It is assumed that processes [0], [1] and [2] are sent from the antenna systems Tx#1 and Tx#2 of the sender apparatus 100 at such timings as illustrated in FIG. 27 and, after the ACK signals corresponding to the processes [0] and [1] sent from the antenna systems Tx#1 and Tx#2 are sent as replies from the receiver apparatus 200 to the sender apparatus 100, the existing position of the mobile station 400 is moved at a timing indicated by reference numeral 500 in FIG. 27 from the MIMO multiplex transmission area 302 to the non-MIMO multiplex transmission (MIMO diversity transmission area) area 301 or 303 which are depicted in FIG. 26.

At this time, if the main antenna system of the sender apparatus 100 for carrying out a process of a stream flowing therein is the antenna system Tx#2, then the sender apparatus 100 sends the process [2] accumulated before the transmission mode is changed over to the MIMO diversity transmission from the antenna systems Tx#1 and Tx#2. The receiver apparatus 200 receives the signals by means of the antenna systems Rx#1 and Rx#2 and carries out synthesis of the received signals to construct the process [2]. Then, although the receiver apparatus 200 tries to carry out packet synthesis between the constructed process [2] and the process [2] retained upon sending in the last cycle, the following subject arises here.

(Subject 1) The receiver apparatus 200 cannot recognize with which retained process the re-sent process [2] should be synthesized. In particular, for example, while the receiver apparatus 200 receives the re-sent process [2] with the MIMO diversity as depicted in FIG. 28, where the packet synthesis is carried out referring only to the process number as described above, since the process [2] is retained by both of the antenna system. Rx#1 and the antenna system Rx#2, it cannot be decided with which process the synthesis should be carried out. For example, if the synthesis with the process (refer to reference numeral 601) retained by the main antenna system Rx#2 is attempted, then the packet synthesis between the process [2] (refer to reference numeral 602) of the antenna system Rx#1 and the process [2] of the antenna system Rx#2 indicated by reference numeral 601 is carried out, resulting in deterioration of the matching property of the synthesis.

In addition, also the following subject arises.

(Subject 2) In the sender apparatus 100, such re-sending in error as described in cases 1 and 2 below occurs.

(Case 1) Where Sending of the ACK/NACK Signal as a Reply is Carried Out Through Timing Adjustment In this instance, the reply timing (reply sending time and reply frequency) of the ACK/NACK signal is conveyed to the mobile station by the base station.

An outline is illustrated in FIG. 29. The receiver apparatus 200 sends the ACK/NACK signal as a reply through the timing adjustment of the main antenna system Rx#2. At this time, the sender apparatus 100 receives the reply with timing information of the main antenna system Tx#2. In this case, since the timing at which the sender apparatus 100 receives the replay overlaps with the re-sending timing of the process

[2] of the antenna systems Tx#2 denoted by reference numeral 603 as seen in FIG. 29, there is the possibility that, while the process [2] of the antenna systems Tx#1 is to be re-sent originally, the process [2] of the antenna systems Tx#2 may possibly be re-sent in error. At this time, the process [2] of the antenna system Tx#1 cannot be re-sent.

(Case 2) Where Sending of a Reply of the ACK/NACK Signal is Carried Out not Through Time Timing Adjustment but Through the Process Number The case 2 is a case wherein sending of a reply of the ACK/NACK signal is executed without carrying out the timing adjustment. Accordingly, different from the case 1, while the instruction of the reply timing adjustment need not be carried out, the process number must be applied upon reply of the ACK/NACK.

An outline is illustrated in FIG. 30. The receiver apparatus 200 sends a reply of the ACK/NACK signal explicitly indicating the process number from the main antenna systems Rx#2. Thereupon, the reply is received by the antenna systems Tx#2. At this time, if the reply for the process [2] of the antenna system Tx#1 is received, then the sender apparatus 100 misinterprets the reply as a NACK signal with regard to the process [2] of the antenna system Tx#2 as seen in FIG. 30. Therefore, the process [2] of the antenna system Tx#1 cannot be re-sent.

In this manner, a subject gives rise that, if overlapping of a process number occurs between different antenna systems, then the receiver apparatus 200 cannot decide which processes of which antenna systems should be synthesized with each other while, in the sender apparatus 100, re-sending in error of a process occurs and the process to be re-sent originally cannot be re-sent.

Further, also where an acknowledgment (ACK/NACK signal) is sent as a replay from the receiver apparatus 200 to the sender apparatus 100 with 2 streams, a subject similar to that described above arises. A manner of this is illustrated in FIGS. 31 and 32. In particular, in the receiver apparatus 200, it cannot be decided with which one of the processes retained by the antenna system Rx#1 and the antenna system Rx#2 the re-sent process [2] should be synthesized as seen in FIG. 28. Further, also in the sender apparatus 100, subjects similar to those described with reference to FIGS. 29 and 30 occur.

In particular, if the transmission mode is changed over from the MIMO multiplex transmission to the MIMO diversity transmission, then:

(1) while, where an acknowledgment to be sent as a replay from the receiver apparatus 200 is sent as a reply from the antenna system Rx#2, the ACK/NACK signal is sent back from the sending antenna ATT 2 of the receiver apparatus 200 as seen in FIG. 31, since, in this instance, the operation of the sender apparatus 100 is similar to those in the cases illustrated in FIGS. 29 and 30, the process [2] of the antenna system Tx#2 is re-sent in error and the process [2] of the antenna system Tx#1 cannot be re-sent;

(2) while, where an acknowledgment to be sent as a replay from the receiver apparatus 200 is sent as a reply by the MIMO diversity, since the ACK/NACK signal is sent through the sending antennas ATT1 and ATT2 as seen in FIG. 32, the sender apparatus 100 carries out diversity reception of the signals sent as a reply from the receiving antennas ATR1 and ATR2. However, since the main antenna systems is the antenna system Tx#2, it is decided finally that the signals described above are replies for the antenna system Tx#2. Therefore, the process [2] of the antenna system Tx#2 is re-sent in error and the process [2] of the antenna system Tx#1 cannot be re-sent.

The present invention has been made in view of such subjects as described above, and it is an object of the present invention to maintain the matching property of process numbers (that is, stream identification) so that communication can be continued normally also where the number of transmission streams varies (decreases) as in a case wherein the transmission mode is changed over from the MIMO multiplex transmission to the MIMO diversity transmission.

Means for Solving the Subjects

In order to attain the object described above, the present invention is characterized in that a transmission controlling method, a sender apparatus and a receiver apparatus for a wireless communication system are used. Particularly:

(1) According to the present invention, there is provided a first mode of a transmission controlling method for a wireless communication system wherein a plurality of stream data can be transmitted in a unit of a predetermined data block from a sender apparatus having a plurality of sending antennas to a receiver apparatus, wherein the sender apparatus annexes, for each of the plural stream data, data block identification information which is not competitive between the stream data to the data block and sends the resulting data block to the receiver apparatus, and the receiver apparatus carries out, based on the data block identification information annexed to the received data block from the sender apparatus, a re-sending synthesis process for the data block received already and a re-sent data block to both of which the same data block identification information is annexed.

(2) Here, information including an antenna identifier relating to any of the sending antennas which sends the stream data may be annexed as the data block identification information to the data block.

(3) Also, information of a series of numbers may be divided into groups for each of the stream data and the number information in a corresponding group may be annexed as the data block identification information to the data block for each of the stream data.

(4) Further, the receiver apparatus may add the data block identification information to a re-sending request for the received data block and send the resulting re-sending request to the sender apparatus, and the sender apparatus may receive the re-sending request and re-send the data block identified based on the data block identification information added to the re-sending request as the re-sent data block to the receiver apparatus.

(5) Further, according to the present invention, there is provided a second mode of a transmission controlling method for a wireless communication method wherein a plurality of stream data can be transmitted from a sender apparatus having a plurality of sending antennas to a receiver apparatus, wherein the sender apparatus detects a decrease control factor of the number of the stream data, and delays, if the decrease control factor is detected, a decrease control timing of the number of the stream data in response to an amount of unsent data regarding stream data which is a decrease control target.

(6) Here, the sender apparatus may carry out the decrease control after sending of the unsent data is completed.

(7) Also, the sender apparatus may monitor wireless quality with the receiver apparatus, and carry out, if the wireless quality becomes lower than a predetermined threshold value, the decrease control even if sending of the remaining data is not completed.

(8) Further, the sender apparatus may monitor wireless quality with the receiver apparatus, and carry out, if there is no remaining data of stream data which is a decrease target at a point of time at which the wireless quality becomes lower than a predetermined threshold value, the decrease control of the number of the streams at the point of time.

(9) Further, according to the present invention, there is provided a sender apparatus for a wireless communication system wherein a plurality of stream data can be transmitted in a unit of a predetermined data block from the sender apparatus which has a plurality of sending antennas to a receiver apparatus, comprising a data block identification information annexing section adapted to annex, for each of the plural pieces of the stream data, data block identification information to the data block, a sending section adapted to send the data block to which the data block identification information is annexed to the receiver apparatus, and a controlling section adapted to control the data block identification information annexing section such that the data block identification information to be annexed to the data block is not competitive between the stream data.

(10) Here, the controlling section may comprise an antenna identifier production section for providing information including an antenna identifier relating to any of the sending antennas for the data streams as the data block identification information to be annexed to the data block of the data stream to the data block identification information annexing section.

(11) Also, the controlling section may comprise a group-based number production section for dividing information of a series of numbers into groups for each data stream and providing, for each data stream, the number information in a corresponding group as the data block identification information to be annexed to the data block to the data block identification information annexing section.

(12) Further, the transmission apparatus for a wireless communication system may further comprise a re-sending controlling section adapted to re-send, where a re-sending request for the received data block to which the data block identification information is annexed is received from the receiver apparatus, the data block identified with the data block identification information to the receiver apparatus.

(13) Further, according to the present invention, there is provided a receiver apparatus for a wireless communication system wherein a plurality of stream data can be transmitted in a unit of a predetermined data block from a sender apparatus having a plurality of sending antennas to the receiver apparatus, wherein a reception section adapted to receive a data block to which data block identification information which is not competitive between the stream data is annexed for each of the plural stream data by the sender apparatus and which is sent from the sender apparatus, and a re-sending synthesis section adapted to carry out, based on the data block identification information annexed to the received data block received by the reception section, a re-sending synthesis process for the data block received already and a re-sent data block to both of which the same data block identification information is annexed.

(14) Further, the receiver apparatus for a wireless communication system may further comprise a re-sending request sending section adapted to annex the data block identification information to a re-sending request for the received data block and send the resulting re-sending request to the sender apparatus.

Effect of the Invention

With the present invention, at least such an effect and an advantage as described just below are obtained.

In particular, also in a case wherein the number of transmission streams between the sender apparatus and the receiver apparatus varies (decreases) as in a case wherein the transmission mode is changed over from the MIMO multiplex transmission to non-MIMO multiplex transmission (MIMO diversity transmission or the like), since competition of data block identification does not occur between the transmission streams, re-sending in error of a data block from the sender apparatus and synthesis in error of the data block in the receiver apparatus can be avoided. Accordingly, normal communication (stream transmission) can be continued between the sender apparatus and the receiver apparatus.

Figure 1:
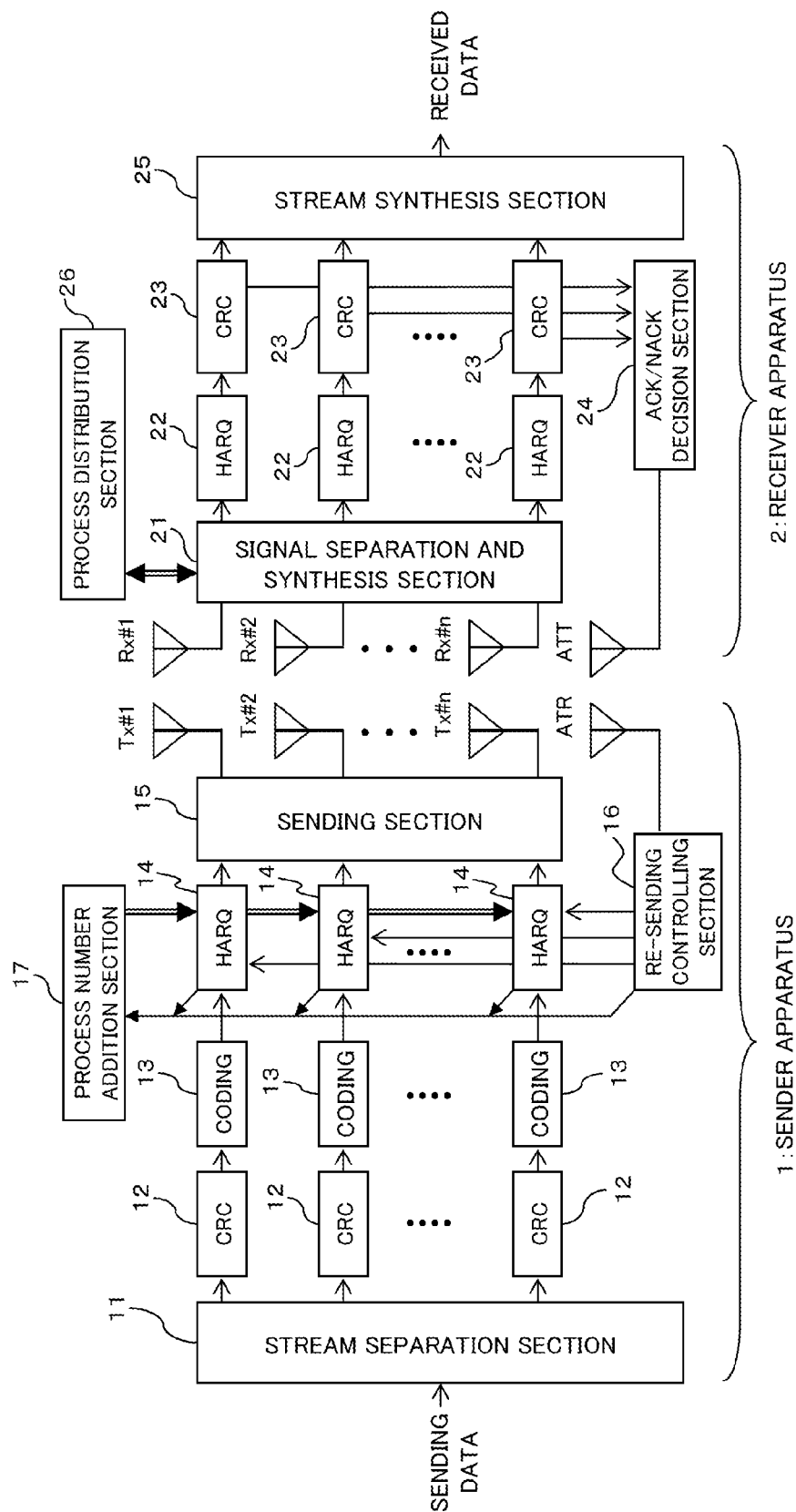
FIG. 1 is a block diagram depicting a configuration of a MIMO transmission system according to a first embodiment of the present invention.

DESCRIPTION OF REFERENCE CHARACTERS 1 sender apparatus (base station)
11 stream separation section
12 CRC addition section
13 coding section
14 HARQ sending processing section (data block identification information addition means)
15 sending section
16 re-sending controlling section
17, 17A process number addition section (controlling means: antenna identifier production section, group-based number production section)
2 receiver apparatus (mobile station)
21 signal separation and synthesis section (reception means)
22 HARQ reception processing section (re-sending synthesis means)
23 CRC calculation section
24 ACK/NACK decision section (re-sending request sending means)
25 stream synthesis section 25
26, 26A process number distribution section
Tx#1, Tx#2, . . . , Tx#n sending antenna (antenna system)
Rx#1, Rx#2, . . . , Rx#n receiving antenna (antenna system)
ATT sending antenna
ATR receiving antenna

BEST MODE FOR CARRYING OUT THE INVENTION

In the following, embodiments of the present invention are described with reference to the drawings. It is to be noted, however, that it is a matter of course that the present invention is not limited to the embodiments described below but can be carried out in various modified forms without departing from the scope of the present invention.

[A] Description of the First Embodiment

FIG. 1 is a block diagram depicting a configuration of a MIMO transmission system according to a first embodiment of the present invention, and the MIMO transmission system depicted in FIG. 1 includes at least one sender apparatus 1 having a plurality of sending antennas (antenna systems) Tx#1, Tx#2, . . . and Tx#n and at least one receiver apparatus 2 having a plurality of receiving antennas (antenna systems) Rx#1, Rx#2, . . . and Rx#n. It is to be noted that the sender apparatus 1 can be applied, for example, as a sending system of a base station apparatus and the receiver apparatus 2 can be applied as a receiving system of a mobile station apparatus. Further, while the number of sending antennas and the number of receiving antennas are equal to each other (n) in the present embodiment, the numbers may be different from each other.

Then, taking notice of essential part of the sender apparatus 1, the sender apparatus 1 includes, for example, a stream separation section 11, a CRC addition section 12 and a coding section 13 as well as a HARQ sending processing section 14 for each sending stream, a sending section 15, a re-sending controlling section 16 and a process number addition section 17. Meanwhile, taking notice of essential part of the receiver apparatus 2, the receiver apparatus 2 includes, for example, a signal separation and synthesis section 21, a HARQ reception processing section 22 and a CRC calculation section 23 for each received stream, an ACK/NACK decision section 24, a stream synthesis section 25 and a process number distribution section 26. It is to be noted that, also in FIG. 1, reference character ATR represents a receiving antenna of the sender apparatus 1 and ATT represents a sending antenna of the receiver apparatus 2, and it is premised for the convenience of description that an acknowledgment (ACK/NACK signal) is sent from the sending antenna ATT of the receiver apparatus 2 with one stream and then is received by the receiving antenna ATR of the sender apparatus 1.

Here, in the sender apparatus 1, the stream separation section 11 separates a sending data signal into sending streams of the antenna systems Tx#i and the CRC addition sections 12 add CRC codes for error detection to the sending streams, and the coding sections 13 carry out coding of the sending streams to which the CRC codes are added into required error correction codes such as turbo codes or the like.

The HARQ sending processing sections 14 carry out a HARQ process (blocking) for the sending streams for each process number and then transfer the resulting sending streams to the sending section 15, and temporarily retain the HARQ blocks (processed) into a memory not depicted in preparation for re-sending control. The sending section 15 carries out a required wireless sending process including modulation by a required modulation method (for example, QPSK, 16QAM, 64QAM or the like), DA conversion, frequency conversion (up convert) into wireless frequency (RF) signals and so forth for the processes inputted from the HARQ sending processing sections 14 and sends the resulting process to the receiver apparatus 2 through one of the sending antennas Tx#i.

The re-sending controlling section 16 decides whether or not re-sending is required based on the ACK/NACK signal from the receiver apparatus 2 received through the receiving antenna ATR and specified, if it is decided that re-sending is required, an antenna system Tx#i to be used for re-sending and a process to be re-sent. Then, the re-sending controlling section 16 controls so that, from the memory of the HARQ sending processing section 14 corresponding to the antenna systems Tx#i of the re-sending target, the retained process is read out and then the read out process is transferred to the sending section 15. It is to be noted that the antenna systems Tx#i to be used for re-sending and the process to be re-sent can be specified, for example, through timing adjustment of the previously described ACK/NACK signal or explicit indication of the process number for the ACK/NACK signal hereinafter described.

Then, the process number addition section 17 adds a process number for each HARQ block (data block) in each HARQ sending processing section 14, and, in the present embodiment, information having a format of (antenna identifier)+(number) is applied as the process number to the HARQ sending processing section 14 so that information which is not competitive (does not overlap) among the antenna systems Tx#i (sending streams), that is, a sending stream identifier, is added to the sending stream. For example, as depicted generally in FIG. 2, the process number to be added to the sending stream of the antenna system Tx#1, process number to be added to the sending stream of the antenna system Tx#2 and process number to be added to the sending stream of the antenna system Tx#n can be represented as "0 . . . 00xxx", "0 . . . 01yyy" and "1 . . . 11zzz" in bit string representation (where x, y and z individually represent 0 or 1), respectively. The sender apparatus 1 adds such unique process numbers as just described to the sending streams and transmits the resulting sending streams to the receiver apparatus 2.

In particular, each HARQ sending processing section 14 implements a function as a data block identification information addition section for adding a process number (data block identification information) to a process (data block) for each of plural streams and the process number addition section 17 implements a function as a controlling section for controlling the HARQ sending processing section 14 so that the process numbers added to the processes are not competitive among the streams. Further, the process number addition section 17 implements also a function as an antenna identifier production section for applying information including an antenna identifier regarding a sending antenna Tx#i of a stream as the process number to be added to the process of the stream to the HARQ sending processing section 14.

On the other hand, in the receiver apparatus 2, the signal separation and synthesis section 21 can separate, under the control of the process distribution section 26, a signal sent from the sending antennas Tx#i (i=1 to n) and received in a spatially multiplexed state by the receiving antennas Rx#i for each process and carry out, upon MIMO diversity, a diversity synthesis process. Then, the HARQ reception processing sections 22 store the received streams (processes) obtained by the signal separation and synthesis section 21 together with the process number in preparation for the re-sending synthesis process and synthesize the stored processes with re-sent processes having the same process number from the sender apparatus 1.

In particular, the signal separation and synthesis section 21 implements a function as a reception section for receiving a process sent after with a process number (number information including an antenna identifier), which is not competitive among the streams, added for each stream by the sender apparatus 1, and each HARQ reception processing section 22 implements a function as a re-sending synthesis section for carrying out a re-sending synthesis process between a process received already and a re-sent process to which the same process is added based on the process number added to the received process received by the signal separation and synthesis section 21 as the reception section.

Each CRC calculation section 23 carries out CRC calculation for a received stream obtained by the HARQ reception processing section 22 to carry out error check, and the ACK/NACK decision section 24 produces an acknowledgment signal based on a result of the CRC calculation and sends (feeds back) the produced signal from the sending antenna ATT to the sender apparatus 1. In particular, the ACK/NACK decision section 24 produces an ACK signal where the CRC calculation result indicates a normal state (OK) but produces a NACK signal where the CRC calculation result indicates an abnormal state (NG), and feeds back the produced signal to the sender apparatus 1.

It is to be noted, however, that, as hereinafter described, the ACK/NACK decision section 24 in the present embodiment can add part (antenna identifier) or all (process number) of the process number information to the acknowledgment signal (ACK/NACK signal) and sends the resulting signal to the sender apparatus 1. In other words, the ACK/NACK decision section 24 in the present embodiment implements a function as a re-sending request sending section for adding an antenna identifier or a process number to a re-sending request (NACK signal) regarding a receiving process and sending the resulting signal to the sender apparatus 1.

The stream synthesis section 25 synthesizes those streams whose CRC calculation result by the CRC calculation sections 23 indicate OK with each other and outputs a result of the synthesis as received data.

Then, the process distribution section 26 identifies the process number of the received process and controls the signal separation and synthesis process by the signal separation and synthesis section 21 so that the received process is distributed and inputted to one of the HARQ reception processing sections 22. It is to be noted that, in order to allow identification of the process number, in the process distribution section 26, information relating to the process number to be used in the process number addition section 17 and an addition method of the process number is stored in advance in a memory or the like not depicted, and the addition method of the process number is shared between the sender apparatus 1 and the receiver apparatus 2.

Operation of the MIMO transmission system of the present embodiment configured in such a manner as described above is described below with reference to FIGS. 3 to 8.

First, in the sender apparatus 1, the stream separation section 11 separates sending data into sending streams for the antenna systems Tx#i and the corresponding CRC addition sections 12 add CRC codes individually to the sending streams. Thereafter, the coding sections 13 perform coding into required error correction codes such as turbo codes or the like for the individual sending streams and input the resulting sending streams to the HARQ sending processing sections 14.

Figure 2:
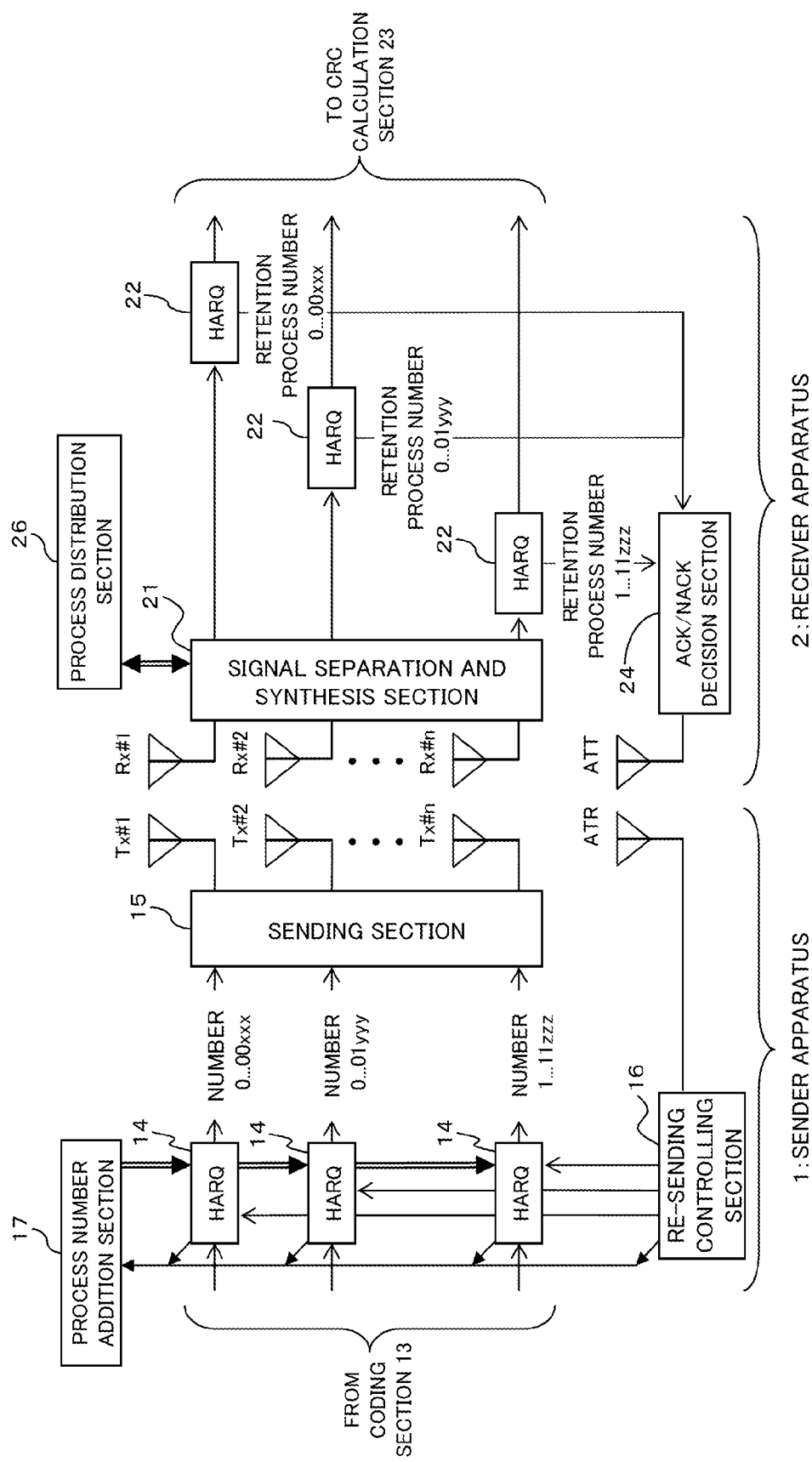
FIG. 2 is a block diagram illustrating a process number addition method for the MIMO transmission system depicted in FIG. 1 and depicting an example of a process number together.

Each of the HARQ sending processing sections 14 performs a HARQ process (blocking) for the corresponding sending stream inputted from the corresponding coding section 13 and adds a process number to the corresponding sending stream under the control of the process number addition section 17 as seen in FIG. 2, and then retains a HARQ block (process) in preparation for the re-sending control and transfers the HARQ block to the sending section 15.

Figure 3:
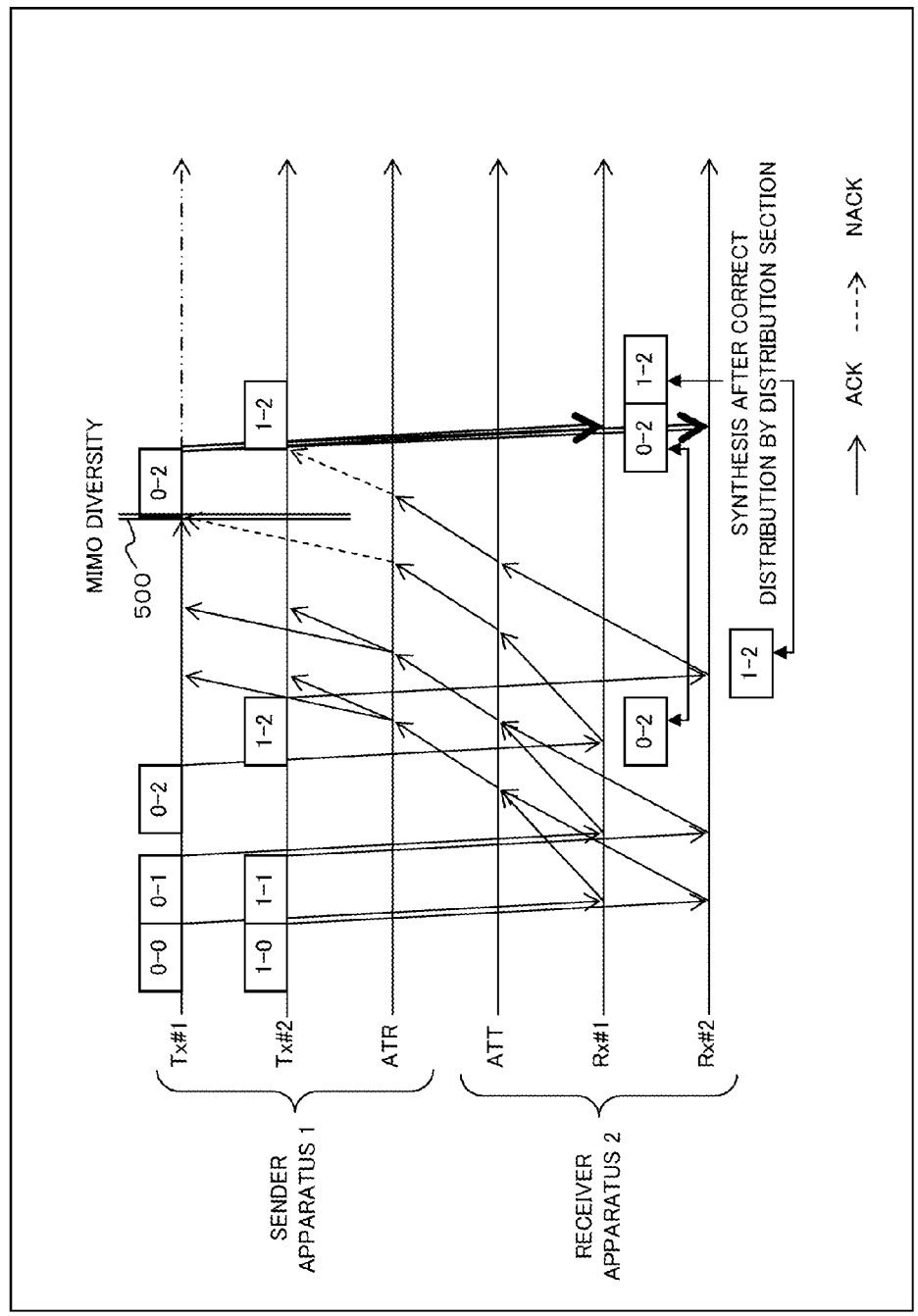
FIG. 3 is a view illustrating re-sending process operation in the MIMO transmission system depicted in FIG. 1.
Figure 4:
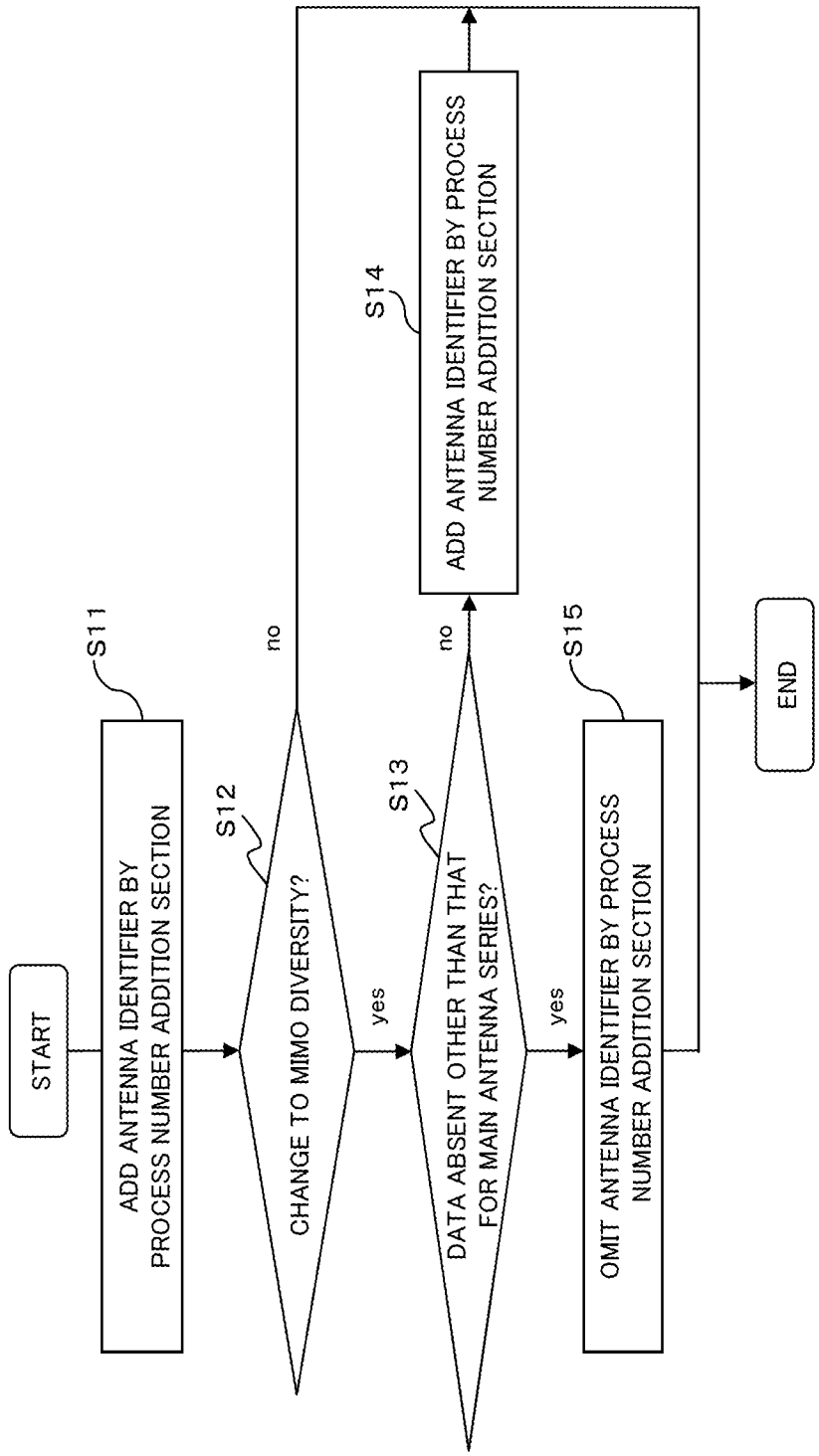
FIG. 4 is a flow chart illustrating operation of a sender apparatus in the MIMO transmission system depicted in FIG. 1.

Consequently, the sending section 15 carries out the above described wireless sending process for the processes inputted from the HARQ sending processing sections 14 and sends a resulting process to the receiver apparatus 2 through one of the sending antennas Tx#i. A concept of a manner of this is illustrated in FIG. 3. FIG. 3 illustrates the manner in a case wherein the sending and receiving antenna systems individually indicate n=2, and a manner is illustrated in FIG. 3 that it is determined that the "antenna identifiers" of the antenna systems Tx#1 and Tx#2 are "0" and "1", respectively, and the "number" of the HARQ blocks is 0, 1, 2 and . . . , and process numbers such as "0-0", "0-1", "0-2" or . . . are successively added individually to the processes to be sent from the antenna systems Tx#1 and process numbers such as "1-0", "1-1", "1-2" or . . . are successively added individually to the processes to be sent from the antenna systems Tx#2. Then, the resulting processes are sent to the receiver apparatus 2 (refer to solid line arrow marks directed toward the downward direction on the plane of FIG. 3).

It is to be noted that the sender apparatus 1 carries out the stream sending while maintaining the addition method of the process number by the process number addition section 17 similarly as in the case described above also after the number of used antenna systems decreases as in the case wherein a changeover from the MIMO multiplex transmission to the MIMO diversity transmission (hereinafter referred to sometimes as transmission mode changeover) occurs (refer to reference numeral 500 in FIG. 3). Here, if the stream sending by the antenna systems other than the main antenna system Tx#i ends, then the sending and receiving of a process may be carried out with the antenna identifier omitted. However, the "main antenna system" signifies an antenna system used even before and after the transmission mode changeover (this similarly applies to the following description) and is the antenna system Tx#2 in the example of FIG. 3.

An operation flow chart of the sender apparatus 1 including such an option as described above is depicted in FIG. 4. In particular, the sender apparatus 1 carries out sending of a stream with a process number annexed as described above by means of the process number addition section 17 (step S11) and monitors and decides whether or not a transmission mode changeover (change to the MIMO diversity transmission) occurs by means of the re-sending controlling section 16 (step S12). If the transmission mode changeover does not yet occur (in case of no at step S12), then the re-sending controlling section 16 controls the process number addition section 17 and the HARQ sending processing section 14 so that the sending of a stream to which a process number is added is continuously carried out as it is.

On the other hand, if a transmission mode changeover occurs (in case of yes at step S12), then the re-sending controlling section 16 decides whether or not data (process) to be sent from any of the antenna systems other than the main antenna system Tx#i is absent (step S13), and, if such data is present (in case of no at step S13), then the re-sending controlling section 16 controls the process number addition section 17 and the HARQ sending processing section 14 so that a process number is added by the process number addition section 17 and then stream sending is carried similarly as at step S11 (step S14).

On the other hand, if data (process) to be sent from any of the antenna systems other than the main antenna systems Tx#i is absent (in case of yes at step S13), then the re-sending controlling section 16 controls the process number addition section 17 and the HARQ sending processing section 14 so that a process number from which the antenna identifier which is an element of the process number is omitted is added and then carries out stream sending (step S15).

On the other hand, in the receiver apparatus 2, a signal received by each of the receiving antennas Rx#i is separated into different processes by the signal separation and synthesis section 21 and each separated signal is distributed to one of the HARQ reception processing sections 22 under the control of the process distribution section 26.

The HARQ reception processing section 22 stores the receive process from the signal separation and synthesis section 21 together with the process number in preparation for the re-sending synthesis process and synthesizes a re-sent process having the same process number and re-sent from the sender apparatus 1 with the stored process (where there is no re-sent process, the received process is outputted as it is).

Thereafter, CRC calculation is carried out for the received process outputted from the HARQ reception processing section 22 by the corresponding CRC calculation section 23 and an acknowledgment signal (ACK signal or NACK signal) according to a result of the calculation is produced by the ACK/NACK decision section 24. Then, the produced signal is fed back to the sender apparatus 1 through the sending antenna ATT (refer to arrow marks directed upwardly on the plane of FIG. 3). However, the ACK/NACK decision section 24 applies the antenna identifier or the process number to the acknowledgment signal.

It is to be noted that any process with regard to which the CRC calculation result is normal is synthesized with processes of different received streams by the stream synthesis section 25 and a result of the synthesis is outputted as data which is successfully received correctly, but any process with regard to which the CRC calculation result is abnormal is abandoned without being inputted to the stream synthesis section 25.

Further, the sender apparatus 1 controls the process number addition section 17 and the HARQ sending processing section 14 in order to send a new process if the ACK signal is received as the acknowledgment signal from the receiver apparatus 2 but to re-send the process with regard to which the decision result in the receiver apparatus 2 is abnormal if the NACK signal is received. It is to be noted that the process to be newly sent or re-sent is specified based on the antenna identifier or the process number included in the received acknowledgment signal.

Consequently, the HARQ sending processing section 14 can re-send, also upon process re-sending, a process having the process number same as that upon sending in the preceding cycle and the receiver apparatus 2 can carryout correct synthesis of the process by means of the HARQ reception processing section 22 even if the number of sending streams (number of sending antennas) is fluctuated as in a case wherein the transmission mode is changed over from the MIMO multiplex transmission to non-MIMO multiplex transmission such as the MIMO diversity transmission, MIMO single transmission or the like through the identification of the received process number and the distribution control of the received process by the process distribution section 26.

For example, if a case wherein the changeover to the MIMO diversity transmission occurs at a timing indicated by reference numeral 500 in FIG. 3 to reduce the number of the sending antennas from two to one (only the antenna systems Tx#2) is considered, then whichever process number a re-sent process received from the sender apparatus 2 after the changeover just described (refer to a double arrow mark directed downwardly on the plane of FIG. 3) has, the receiver apparatus 2 can carry out correct distribution of the process by means of the process distribution section 26 so that the correct synthesis of processes, that is, synthesis of the processes individually having the process numbers same as each other, is carried out. In particular, degradation of the matching property of the synthesis can be prevented (the subject 1 described above can be solved).

Further, by contriving the replying method of the ACK/NACK in such a manner as given in cases 1 and 2 described below, also the subject 2, that is, the subject that, in the sender apparatus 1, re-sending in error of a process occurs and a process to be originally re-sent cannot be re-sent, can be solved.

Figure 5:
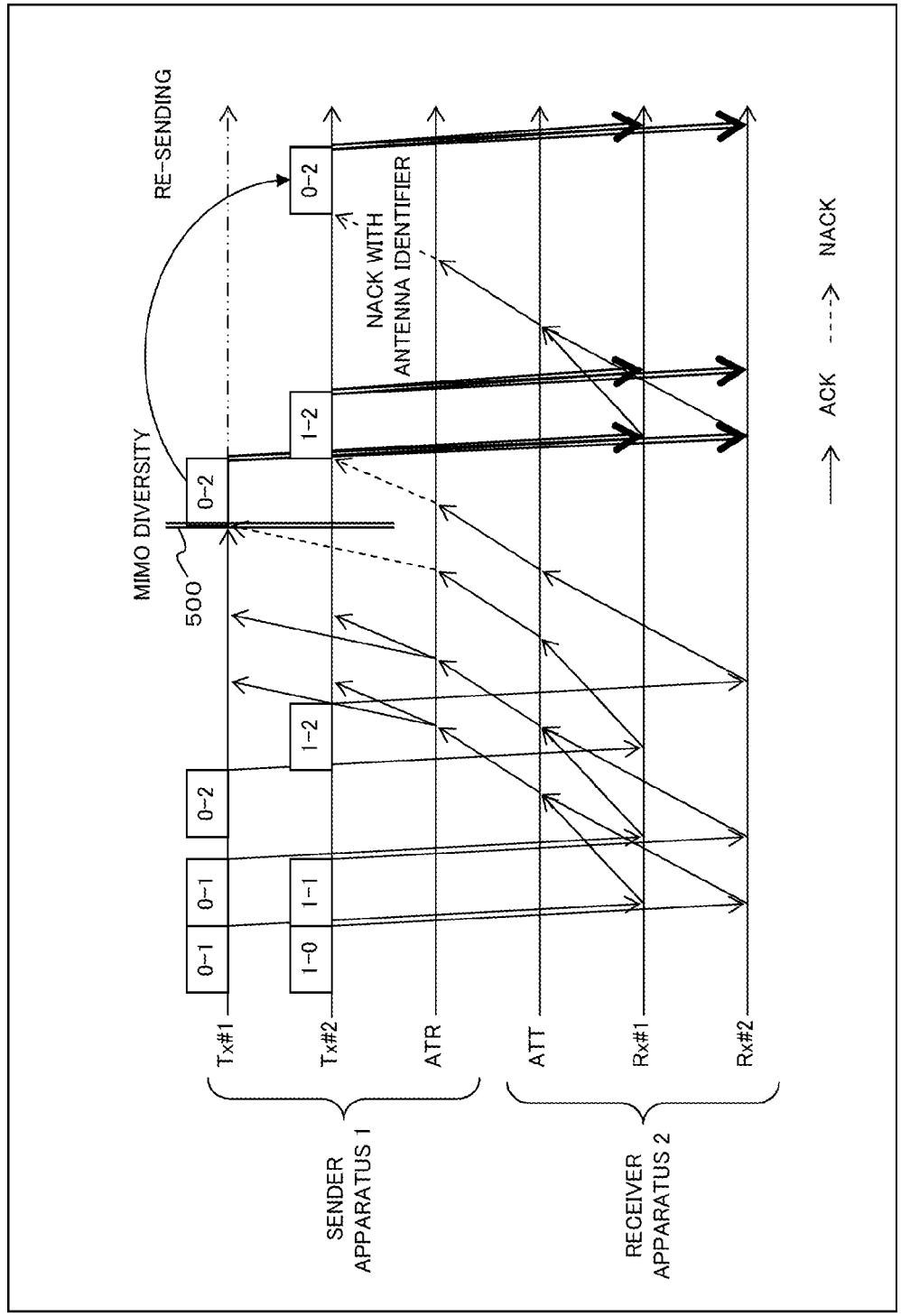
FIG. 5 is a view illustrating a reply sending method (case 1) of an ACK/NACK in the MIMO transmission system depicted in FIG. 1.
Figure 6:
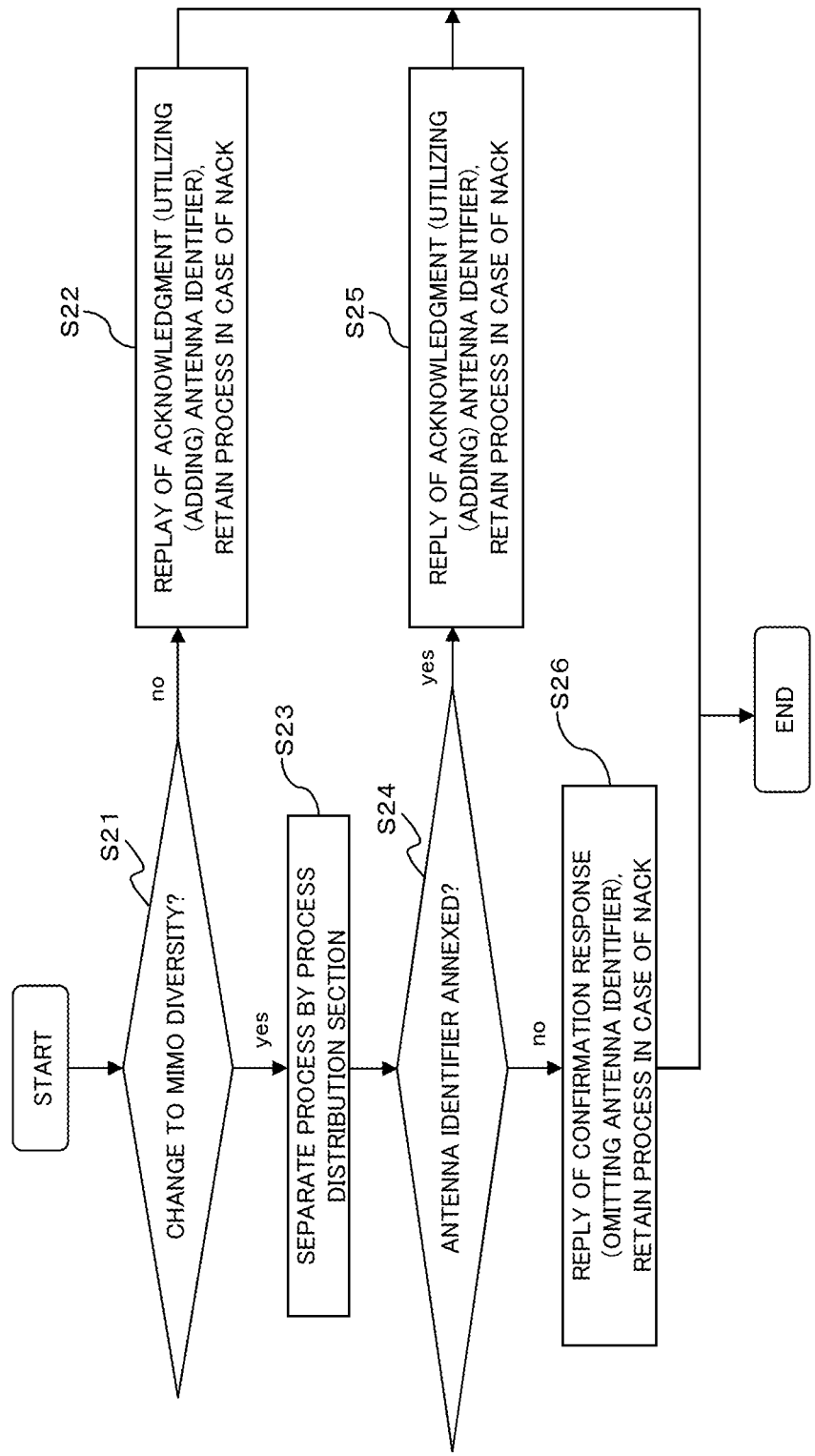
FIG. 6 is a flow chart illustrating operation (case 1) of a receiver apparatus in the MIMO transmission system depicted in FIG. 1.

(Case 1) Where the ACK/NACK Signal is Received Through Timing Adjustment (FIGS. 5 and 6)

A diagram of a concept in the present case corresponding to FIG. 3 is depicted in FIG. 5. As depicted in FIG. 5, also after a transmission mode changeover (change to the MIMO diversity transmission) occurs (refer to reference numeral 500), the receiver apparatus 2 utilizes (adds) the antenna identifier of each antenna system to carryout sending of a reply of an acknowledgment signal (ACK/NACK signal). Here, "utilization" of the antenna identifier signifies not that the antenna identifier is added explicitly to send the ACK/NACK signal as a reply but that, for example, even if it is determined that the number of such main antenna systems is one, the sender apparatus issues an instruction of a frequency band for the ACK/NACK signal of each antenna system to the receiver apparatus and the receiver apparatus carries out sending of a reply of the ACK/NACK utilizing the instructed frequency band. Therefore, if the sender apparatus receives the ACK/NACK signal, then it can analyze the frequency band of the signal to identify to which antenna system the ACK/NACK corresponds. On the other hand, "addition" of an antenna identifier signifies that an antenna identifier is added explicitly to the ACK/NACK signal exactly as illustrated in FIG. 5.

For example, taking notice of the process "0-2" in FIG. 5 sent from the antenna system Tx#1 (main antenna system is Tx#2) of the sender apparatus 1 after transmission mode changeover occurs, the receiver apparatus 2 produces a signal to which the antenna identifier "0" which is (part of) a number element of the received process "0-2" is added as an acknowledgment signal to the process "0-2" by means of the ACK/NACK decision section 24 and sends the produced signal as a reply to the sender apparatus 1.

Consequently, as a premise that synchronism with the receiver apparatus 2 is achieved at least regarding a reply sending timing of the acknowledgment signal to the sent process (in particular, the sender apparatus 1 receives the acknowledgment signal through timing adjustment with the receiver apparatus 2), the sender apparatus 1 can recognize that the sent acknowledgment signal corresponds to the process "0-2" by means of the re-sending controlling section 16 and can correctly re-send the process "0-2" from the main antenna system Tx#2 without re-sending in error of the process "1-2".

It is to be noted that, where the sender apparatus 1 carries out sending and reception of a process with the antenna identifier omitted as described above (in particular, where all of processes to be sent from the antenna systems other than the main antenna system Tx#2 can be transmitted), even if a reply of the acknowledgment is sent with the antenna identifier omitted, since the timing adjustment is carried out, the sender apparatus 1 can identify to which process the acknowledgment signal corresponds.

An operation flow chart of the receiver apparatus 2 in the present case 1 is depicted in FIG. 6.

In particular, the receiver apparatus 2 monitors and decides whether or not a transmission mode changeover (change to the MIMO diversity transmission) occurs (step S21), and if a transmission mode changeover does not occur (in case of no at step S21), then the ACK/NACK decision section 24 produces an acknowledgment signal to which an antenna identifier which is a number element of the received process is added and sends the produced signal as a reply to the sender apparatus 1. Further, if the acknowledgment signal is the NACK signal, then the HARQ reception processing section 22 retains the received process in preparation for the re-sending synthesis (step S22).

On the other hand, if a transmission mode changeover occurs (in case of yes at step S21), then the receiver apparatus 2 carries out separation of the received process (identification of the process number) by means of the process distribution section 26 (step S23) and decides whether or not an antenna identifier is added (step S24). As a result, if an antenna identifier is added (in case of yes at step S24), then the receiver apparatus 2 produces an acknowledgment signal to which the antenna identifier which is a number element of the received process is added and sends the produced signal as a reply to the sender apparatus 1 similarly as in the case at step S22, and, if the produced acknowledgment signal is the NACK signal, then the HARQ reception processing section 22 retains the received process in preparation for the re-sending synthesis (step S25).

On the other hand, if an antenna identifier is not added (in case of no at step S24), then since timing adjustment is carried out, the receiver apparatus 2 sends a reply of the acknowledgment to the sender apparatus 1 with the antenna identifier omitted, and, if the acknowledgment signal is the NACK signal, then the HARQ reception processing section 22 retains the received process in preparation for the re-sending synthesis (step S26).

In this manner, in the present case 1, if a transmission mode changeover (change to the MIMO diversity transmission) occurs and each sending process needs to be identified among the antenna systems Tx#i (Rx#i), then only the antenna identifier which is an information element of the received process number is added to the acknowledgment signal and the produced signal is sent as a reply to the sender apparatus 1 while suppressing the information amount thereof to a minimum, but, if all of the processes to be sent from the antenna systems other than the main antenna system Tx#2 can be transmitted and each transmission process does not need to be identified between the antenna systems Tx#i (Rx#i), then addition of the antenna identifier is omitted. Therefore, effective utilization of wireless resources between the sender apparatus 1 and the receiver apparatus 2 can be achieved.

Figure 7:
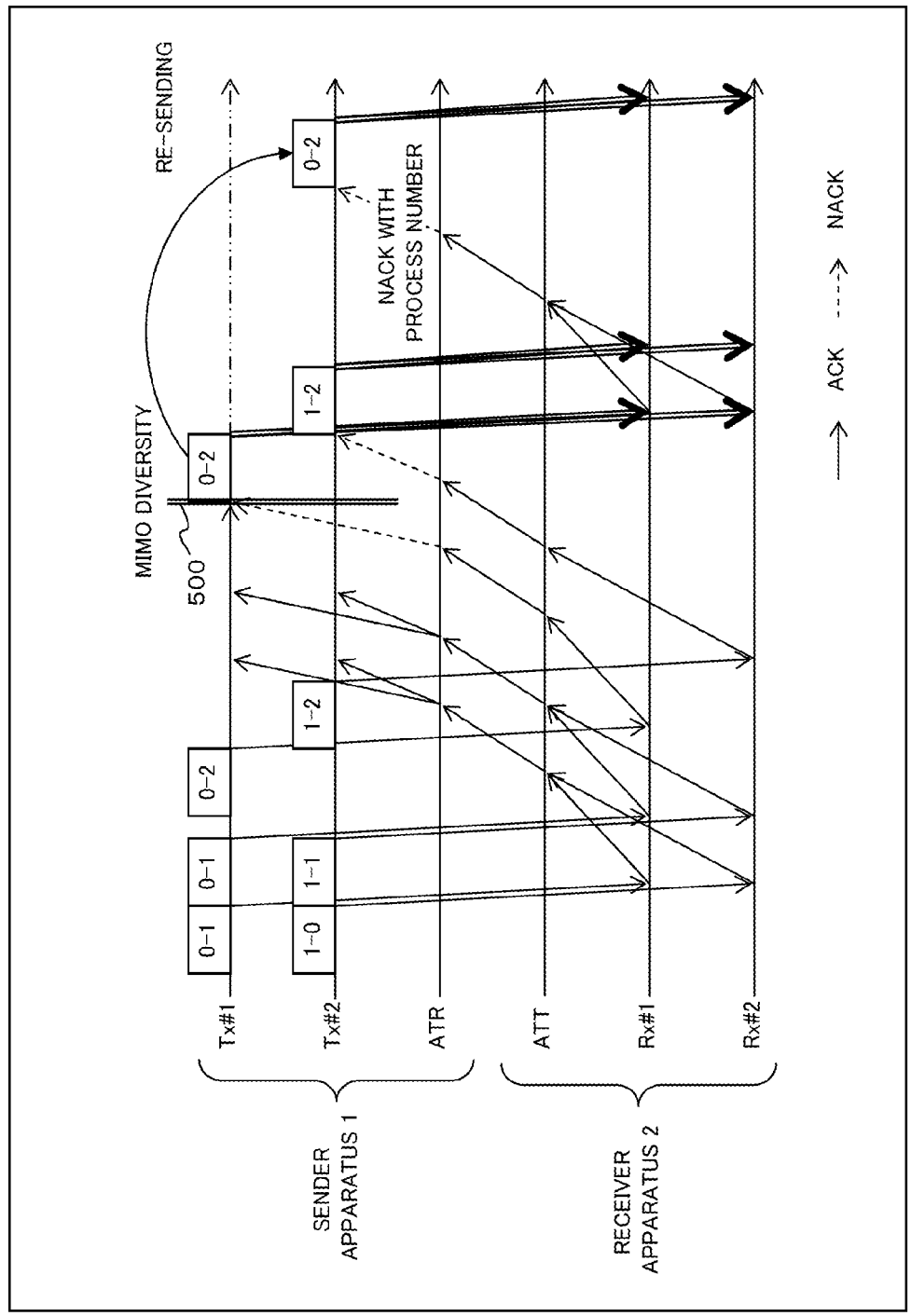
FIG. 7 is a view illustrating a reply sending method (case 2) of an ACK/NACK in the MIMO transmission system depicted in FIG. 1.
Figure 8:
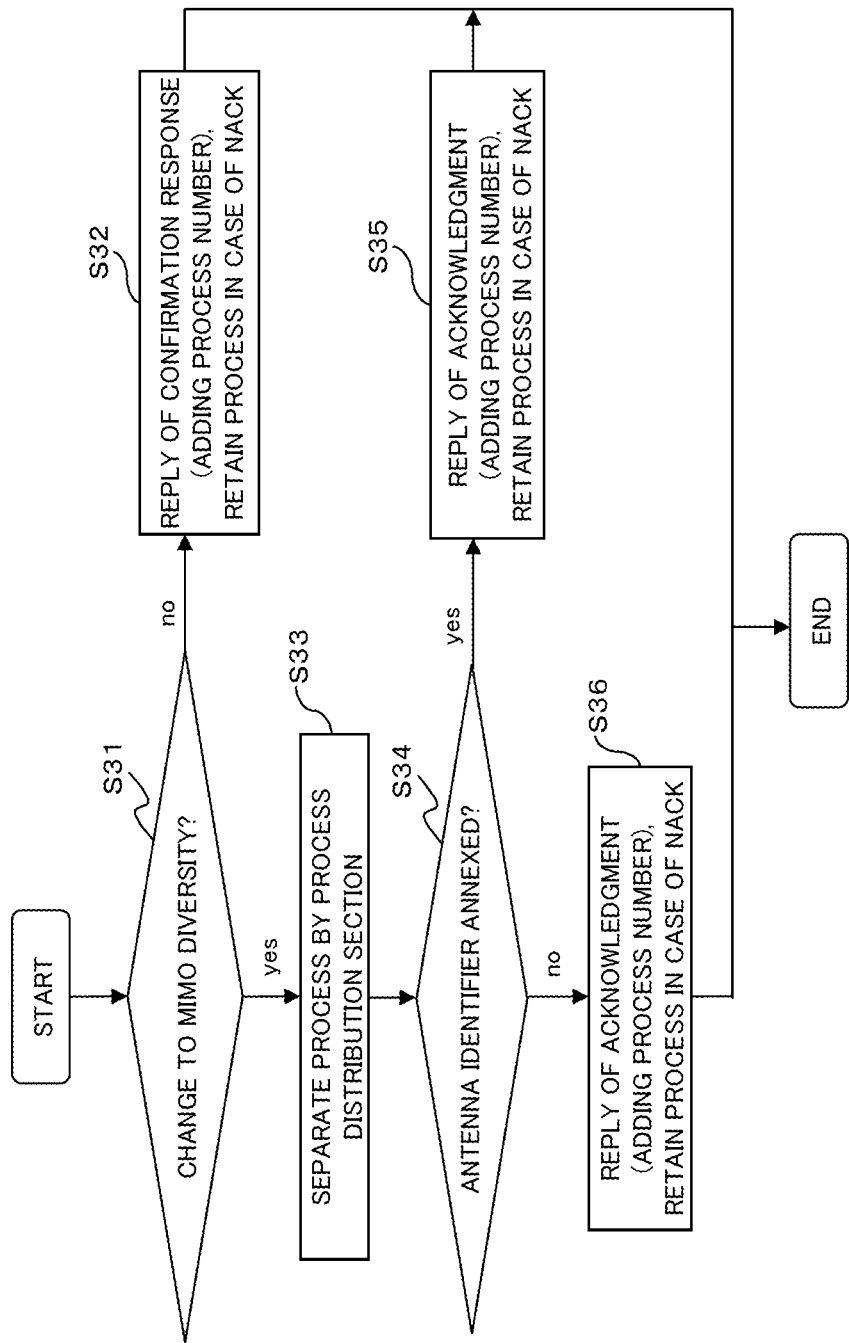
FIG. 8 is a flow chart illustrating operation (case 2) of the receiver apparatus in the MIMO transmission system depicted in FIG. 1.

(Case 2) Where the ACK/NACK Signal is Sent as a Reply with a Process Number Added Explicitly (FIGS. 7 and 8)

A diagram of a concept in the present case corresponding to FIGS. 3 and 5 is depicted in FIG. 7. As seen in FIG. 7, even after a transmission mode changeover (change to the MIMO diversity transmission) occurs (refer to reference numeral 500), since timing adjustment is not established between the sender apparatus and the receiver apparatus, the receiver apparatus 2 sends the ACK/NACK as a reply with a process number added explicitly.

For example, also in the present case 2, taking notice of the process "0-2" sent from the antenna system Tx#1 (main antenna system is Tx#2) of the sender apparatus 1 after a transmission mode changeover occurs in FIG. 7, the receiver apparatus 2 produces a signal to which the process number of the received process "0-2" is added as an acknowledgment signal with regard to the process "0-2" by means of the ACK/NACK decision section 24 and sends the produced signal as a reply to the sender apparatus 1.

Consequently, the sender apparatus 1 can identify to which process of which antenna system Tx#i the acknowledgment signal is a reply (in the present example, to the process "0-2") by means of the re-sending controlling section 16 irrespective of whether or not the synchronism with the receiver apparatus 2 is established regarding a reply sending timing of the acknowledgment signal to the sending process, and the process "0-2" can be correctly re-sent from the main antenna system Tx#2 without re-sending in error of the process "1-2".

An operation flow chart of the receiver apparatus 2 in the present case 2 is depicted in FIG. 8.

In particular, the receiver apparatus 2 monitors and decides whether or not a transmission mode changeover (change to the MIMO diversity transmission) occurs (step S31), and, if a transmission mode changeover does not occur (in case of no at step S31), then the ACK/NACK decision section 24 produces an acknowledgment signal to which a received process number is added and sends the produced signal as a reply to the sender apparatus 1. Further, where the acknowledgment signal is the NACK signal, the HARQ reception processing section 22 retains the received process in preparation for the re-sending synthesis (step S32).

On the other hand, if a transmission mode changeover occurs (in case of yes at step S31), then the receiver apparatus 2 carries out separation of the received process (identification of the process number) by means of the process distribution section 26 (step S33) and decides whether or not an antenna identifier is added (step S34). As a result, if an antenna identifier is added (in case of yes at step S34), then the receiver apparatus 2 adds the received process number to an acknowledgment signal and sends the acknowledgment signal as a reply to the sender apparatus 1 similarly as in the case at step S32, and, if the acknowledgment signal is the NACK signal, then the HARQ reception processing section 22 retains the received process in preparation for the re-sending synthesis (step S35).

On the other hand, if an antenna identifier is not added (in case of no at step S34), that is, if the sender apparatus 1 can transmit all of the processes to be sent from the antenna systems other than the main antenna system Tx#i and carries out sending and reception of a process with the antenna identifier omitted, then since addition of an antenna identifier can be omitted, the receiver apparatus 2 sends the acknowledgment signal as a reply to the sender apparatus 1 utilizing the number of the main antenna system Tx#2 (process number similar to that of the conventional method wherein the antenna identifier is omitted) without adding the antenna identifier, and, if the acknowledgment signal is the NACK signal, then the HARQ reception processing section 22 retains the received process in preparation for the re-sending synthesis (step S36).

In this manner, in the present case 2, if a transmission mode changeover (change to the MIMO diversity transmission) occurs and each sending process needs to be identified among the antenna systems Tx#i (Rx#i), then since an acknowledgment signal is sent as a reply to the sender apparatus 1 with a received process number added, even if synchronism with the receiver apparatus 2 is not established regarding a reply sending timing of the acknowledgment signal to the sending process, the sender apparatus 1 can correctly identify the process to be re-sent and re-sending in error of the re-sent process can be suppressed with certainty.

Further, also in the present case 2, if all of the processes to be sent from the antenna systems other than the main antenna system Tx#2 can be transmitted and the sending antenna does not need to be identified among the antenna systems Tx#i (Rx#i), then since addition of the sending antenna is omitted, also effective utilization of wireless resources between the sender apparatus 1 and the receiver apparatus 2 can be achieved.

[B] Description of Second Embodiment

Figure 9:
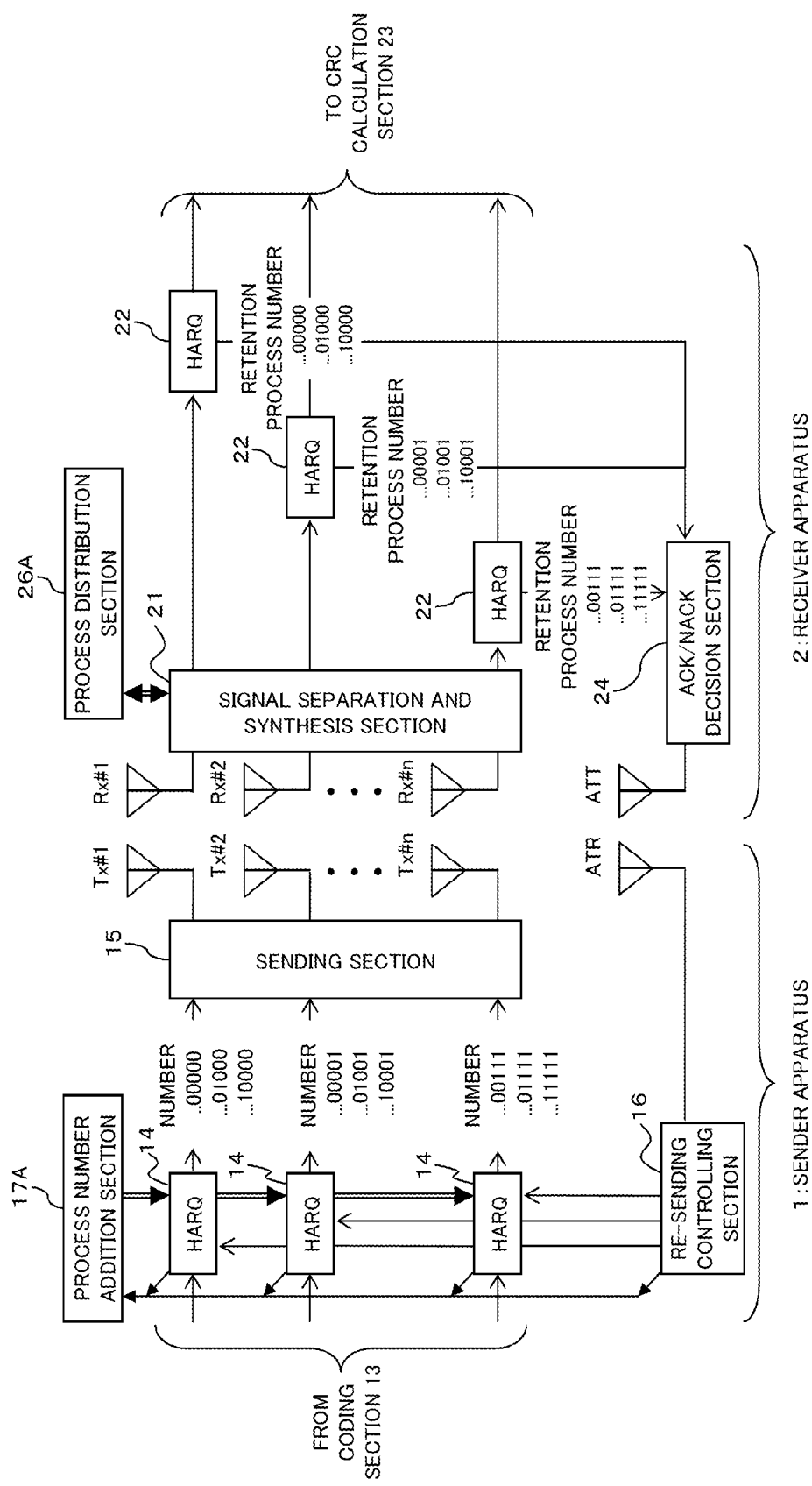
FIG. 9 is a block diagram depicting a configuration of a MIMO transmission system according to a second embodiment of the present invention together with an example of a process number.

FIG. 9 is a block diagram depicting a configuration of a MIMO transmission system according to a second embodiment of the present invention and corresponding to FIG. 2. The MIMO transmission system (sender apparatus 1 and receiver apparatus 2) depicted in FIG. 9 is different in comparison with the configuration depicted in FIGS. 1 and 2 in that it includes a process number addition section 17A and a process distribution section 26A in place of the process number addition section 17 and the process distribution section 26 described hereinabove. It is to be noted that the configuration of the other part is same as or similar to that described hereinabove with reference to FIGS. 1 and 2, and in FIG. 9, some of the components of the sender apparatus 1 (stream separation section 11, CRC calculation section 12 and coding section 13) and some of the components of the receiver apparatus 2 (CRC calculation section 22 and stream synthesis section 25) are not depicted.

Here, the process number addition section 17A in the present embodiment independently adds a process number to a HARQ block (process) obtained by the HARQ sending processing section 14 such that it is not competitive among all of the antenna systems Tx#i. For example, addition methods described in (1) and (2) given below are available.

(1) A method wherein, as seen in FIG. 9, process numbers are successively added in an ascending order (or may be added in the descending order) from the antenna system Tx#1 to the antenna system Tx#n and, after a process number for a stream of the last antenna system Tx#n is determined, the process numbers are successively added in the ascending order again beginning with the first antenna system Tx#1. In short, a method wherein a series of process numbers are added repetitively to all of the antenna systems Tx#i. For example, the process number regarding the antenna system Tx#1 is, in a representation of a bit train, " . . . 00000"; the process number regarding the antenna system Tx#n is " . . . 00111"; the succeeding process number of the antenna system Tx#1 is " . . . 01000"; and the succeeding process number of the antenna system Tx#n is " . . . 01111".

Figure 10:
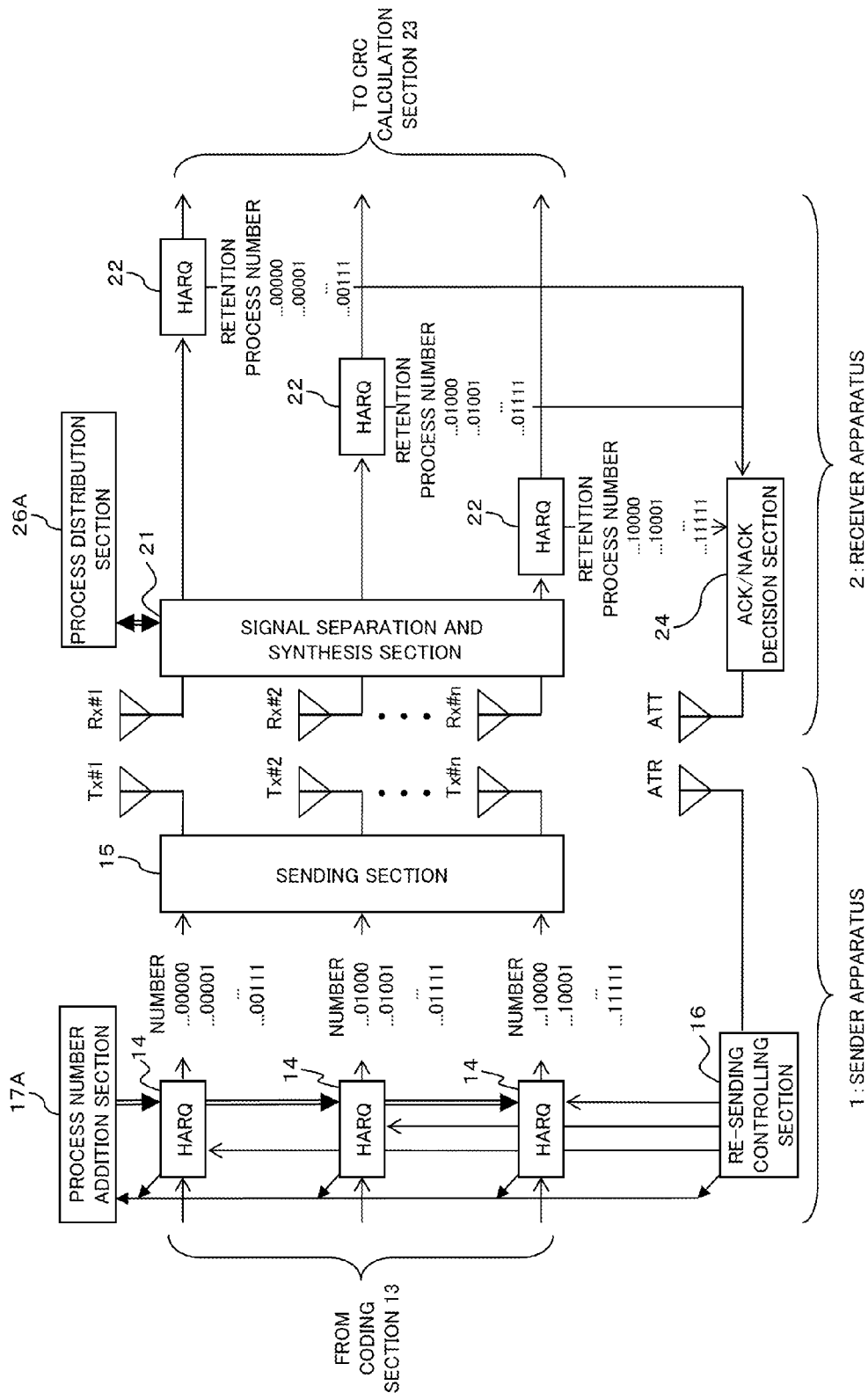
FIG. 10 is a block diagram illustrating a different process number addition method for the MIMO transmission system depicted in FIG. 9 and depicting an example of a process number together.

(2) A method wherein, as seen in FIG. 10, a series of process numbers which are independent of each other (are not competitive with each other) for each antenna system Tx#i are successively added in the ascending order (or may be added in the descending order). For example, the process numbers for the antenna system Tx#1 are " . . . 00000~ . . . 00111"; the process numbers for the antenna system Tx#2 are " . . . 01000~ . . . 01111"; and the process numbers for the antenna system Tx#3 are " . . . 10000~ . . . 11111".

In other words, the process number addition section (controlling means) 17A in the present embodiment has also a function as a group-based number production section which divides information of a series of numbers into groups for each stream and provides the number information in a corresponding group as the process number (data block identification information) to be added to the sending process for each of the streams to the HARQ sending processing section 14 in order to implement addition control of a process number which is not competitive among different streams, which is similar to that in the first embodiment.

It is to be noted that, in both of the cases of (1) and (2) given above, in order to avoid a subject similar to that of the first embodiment, it is necessary to share an addition method of a process number between the sender apparatus 1 and the receiver apparatus 2.

In particular, for the process number identification, process numbers and an addition method of the process numbers used in the process number addition section 17A are stored in advance in a memory or the like not depicted in the process distribution section 26A of the receiver apparatus 2 and an addition method for a process number is shared between the sender apparatus 1 and the receiver apparatus 2 in advance. Consequently, the process distribution section 26A can identify the process number of a received process and control the signal separation and synthesis process by the signal separation and synthesis section 21 so that the received process is distributed and inputted to one of the HARQ reception processing sections 22 based on the identified process number.

In the following, operation of the MIMO transmission system of the present embodiment configured in such a manner as described above is described with additional reference to FIGS. 11 to 14.

First, in the sender apparatus 1, sending data are separated into sending streams for the antenna systems Tx#i by the stream separation section 11, and CRC codes are added to the sending streams by the corresponding CRC addition sections 12, whereafter the sending streams are coded into required error correction codes such as turbo codes by the coding sections 13 and then inputted to the HARQ sending processing sections 14.

Figure 12:
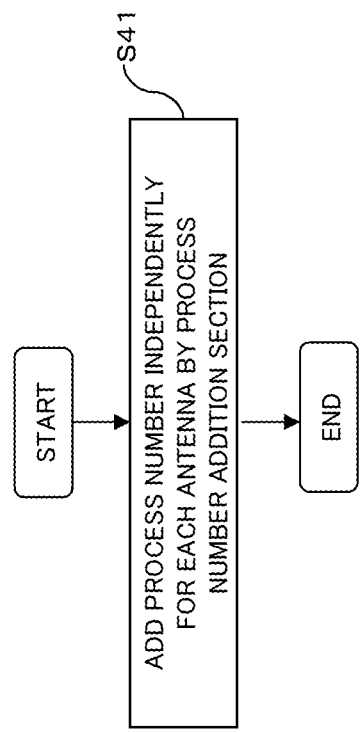
FIG. 12 is a flow chart illustrating operation of a sender apparatus in the MIMO transmission system depicted in FIG. 9.

In the HARQ sending processing sections 14, the sending streams inputted from the coding sections 13 are subjected to a HARQ process (converted into blocks), and process numbers provided from the process number addition section 17A and non-competitive among the antenna systems Tx#i as depicted in FIG. 9 or 10 are added to the HARQ blocks (step S41 of FIG. 12). Then, the HARQ blocks (processes) are stored in preparation for re-sending control and are transferred to the sending section 15.

Figure 11:
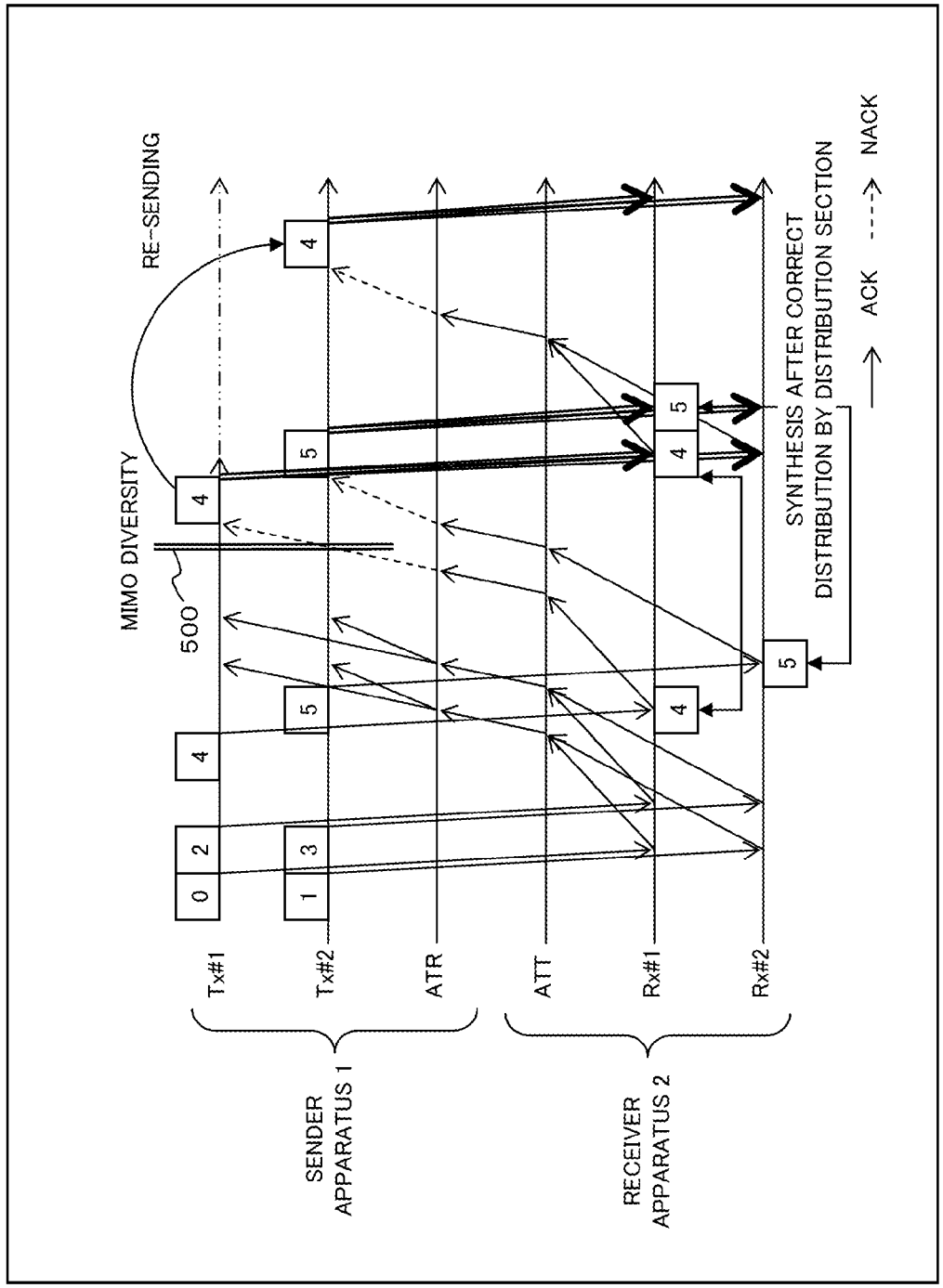
FIG. 11 is a view illustrating re-sending process operation in the MIMO transmission system depicted in FIG. 9.

Consequently, the sending section 15 carries out the wireless sending process described hereinabove for each of the processes inputted from the HARQ sending processing sections 14 and sends the resulting process from one of the antenna systems Tx#i to the receiver apparatus 2. FIG. 11 illustrates a concept of a manner in this instance. FIG. 11 is a view corresponding to FIG. 3 in the first embodiment and illustrates the manner where the antenna system for both of sending and reception are n=2 and besides the addition method illustrated in FIG. 9 is applied. In FIG. 11, a manner is illustrated wherein, to processes to be sent from the antenna system Tx#1, even-numbered process numbers of "0", "2", "4", . . . are successively added while, to processes to be sent from the antenna system Tx#2, odd-numbered process numbers of "1", "3", "5", . . . are successively added independently of (so as not to be competitive with) the process numbers regarding the antenna system Tx#1 and the processes having the processes numbers added thereto are sent to the receiver apparatus 2 (refer to solid line arrow marks directed downwardly on the plane of FIG. 9).

It is to be noted that, also in the present embodiment, also after the number of used antenna system decreases as in a case wherein a transmission mode changeover occurs (refer to reference numeral 500 in FIG. 11), the sender apparatus 1 maintains the addition method of a process number by means of the process number addition section 17A in a similar manner as described above to carry out stream sending.

In the receiver apparatus 2, for example, in the case of FIG. 11, the process "4" and the process "5" are received, and the process numbers of them are identified and the processes can be distributed to correct antenna systems Rx#i by the process distribution section 26A. Accordingly, even if a transmission mode changeover occurs, the HARQ reception processing section 22 can carry out correct synthesis of the processes, that is, synthesis of the processes of the same process number. In other words, degradation of the matching property of synthesis can be prevented (the subject 1 described hereinabove can be solved).

Further, also in the present embodiment, by contriving the replying method of the ACK/NACK in such a manner as described in cases 1 and 2 given below, also the subject 2 described hereinabove, that is, the subject that re-sending in error of a process occurs with the sender apparatus 1 and a process which should originally be re-sent cannot be re-sent, can be solved.

Figure 13:
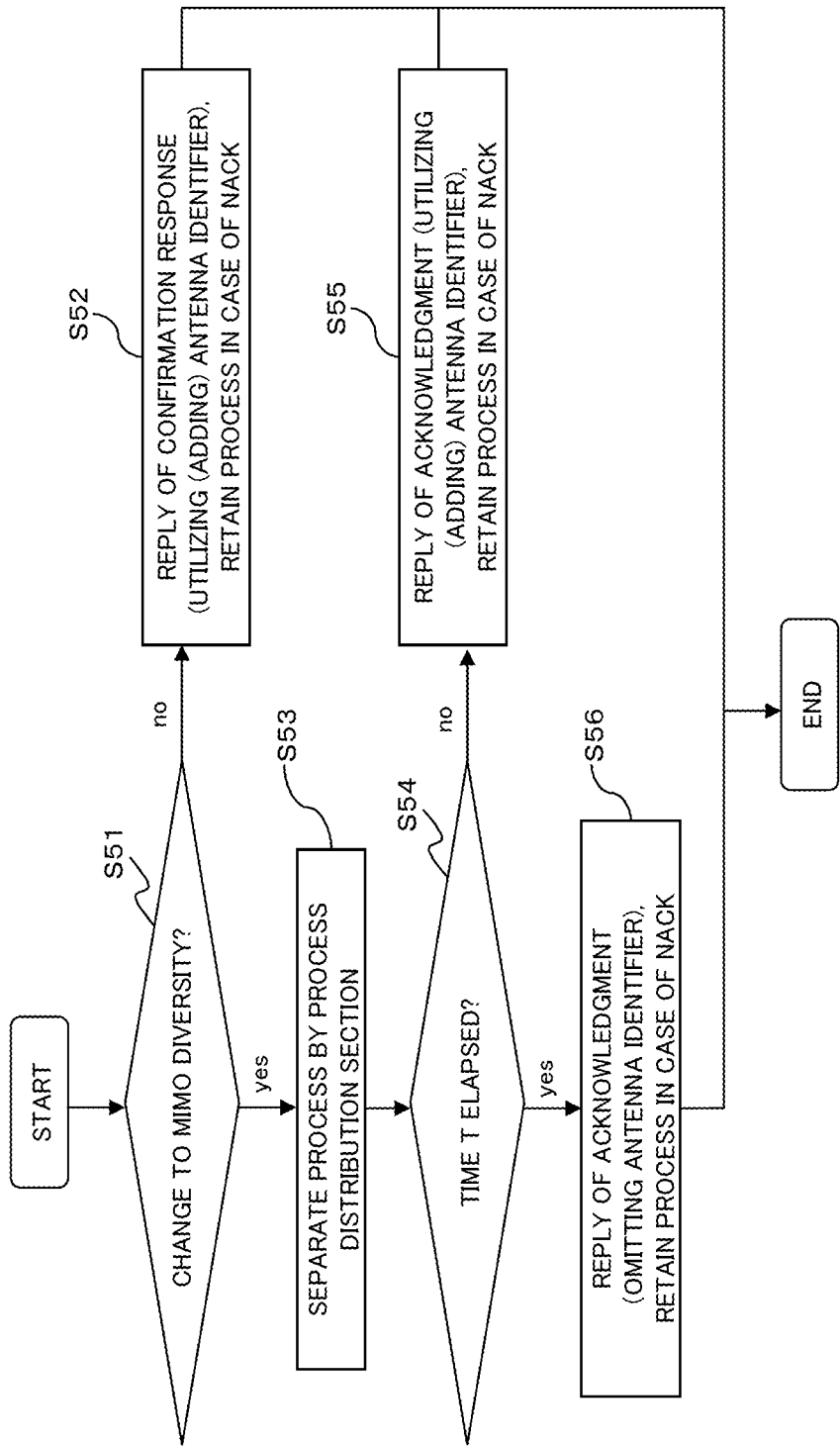
FIG. 13 is a flow chart illustrating operation (case 1) of a receiver apparatus in the MIMO transmission system depicted in FIG. 9.

(Case 1) Where ACT/NACK Signal is Received by Timing Adjustment (FIG. 13)

Even after a transmission mode changeover (change to the MIMO diversity transmission) occurs (refer to reference numeral 500 in FIG. 11), the receiver apparatus 2 carries out reply of an acknowledgement signal (ACK/NACK) utilizing (adding) the antenna identifier of each antenna system similarly as in the first embodiment. Here, to "utilize" and "add" an antenna identifier signifies similarly as in the first embodiment.

It is to be noted that, after the transmission mode changes over to the MIMO diversity, in the first embodiment, if a process number to which an antenna identifier is not added is received by the receiver apparatus, then this signifies that a process is thereafter sent only from the main antenna system. In the second embodiment, since no antenna identifier is added to an access number received, if a certain time period (T) elapses, then the sender apparatus 1 thereafter sends a process only from the main antenna system (in the case of FIG. 11, the antenna system Tx#2). Therefore, after the time period T elapses, the receiver apparatus 2 can omit an antenna identifier in reply of an acknowledgement and can send an acknowledge signal as a reply to the sender apparatus 1 using only the timing information of the main antenna system.

An operation flow chart of the receiver apparatus 2 in the presence case 1 is depicted in FIG. 13.

As illustrated in FIG. 13, the receiver apparatus 2 monitors and decides whether or not a transmission mode changeover (change to the MIMO diversity transmission) occurs (step S51). If a transmission mode changeover does not occur (in case of no at step S51), then the ACK/NACK decision section 24 produces an acknowledge signal which utilizes an antenna identifier (has an antenna identifier added thereto) and sends the acknowledgement signal as a reply to the sender apparatus 1. Further, if the acknowledgement signal is the NACK signal, then the HARQ reception processing section 22 retains the received process in preparation for re-sending synthesis (step S52).

On the other hand, if a transmission mode changeover occurs (in case of yes at step S51), the receiver apparatus 2 carries out separation of a received process (identification of a process number) by means of the process distribution section 26A (step S53), and decides whether or not the time period T elapses (step S54). As a result, if the time period T does not elapse (in case of no at step S54), then the receiver apparatus 2 produces an acknowledgement signal which utilizes the antenna identifier (has the antenna identifier added thereto) and sends the acknowledgement signal as a reply to the sender apparatus 1 similarly as at step S52. Further, if the acknowledgement signal is the NACK signal, then the HARQ reception processing section 22 retains the received process in preparation for re-sending synthesis (step S55).

On the other hand, if the time period T elapses (in case of yes at step S54), then the receiver apparatus 2 utilizes the timing information of the main antenna system to send the acknowledgement signal to the sender apparatus 1. Further, if the acknowledgement signal is the NACK signal, then the HARQ reception processing section 22 retains the received process in preparation for re-sending synthesis (step S56).

In this manner, also in the present case 1, as far as a transmission mode changeover (change to the MIMO diversity transmission) occurs and it is necessary to identify each transmission process among the antenna systems Tx#i (Rx#i), each antenna identifier is utilized (added) to send an acknowledgement signal as a reply to the sender apparatus 1. Then, if all of the processes other than those by the main antenna system Tx#2 are transmitted successfully and it becomes necessary to identify each sending process among the antenna systems Tx#i (Rx#i), then only the timing information of the main antenna system can be utilized to send an acknowledgement as a reply, and therefore, effective utilization of wireless resources between the sender apparatus 1 and the receiver apparatus 2 can be anticipated.

Figure 14:
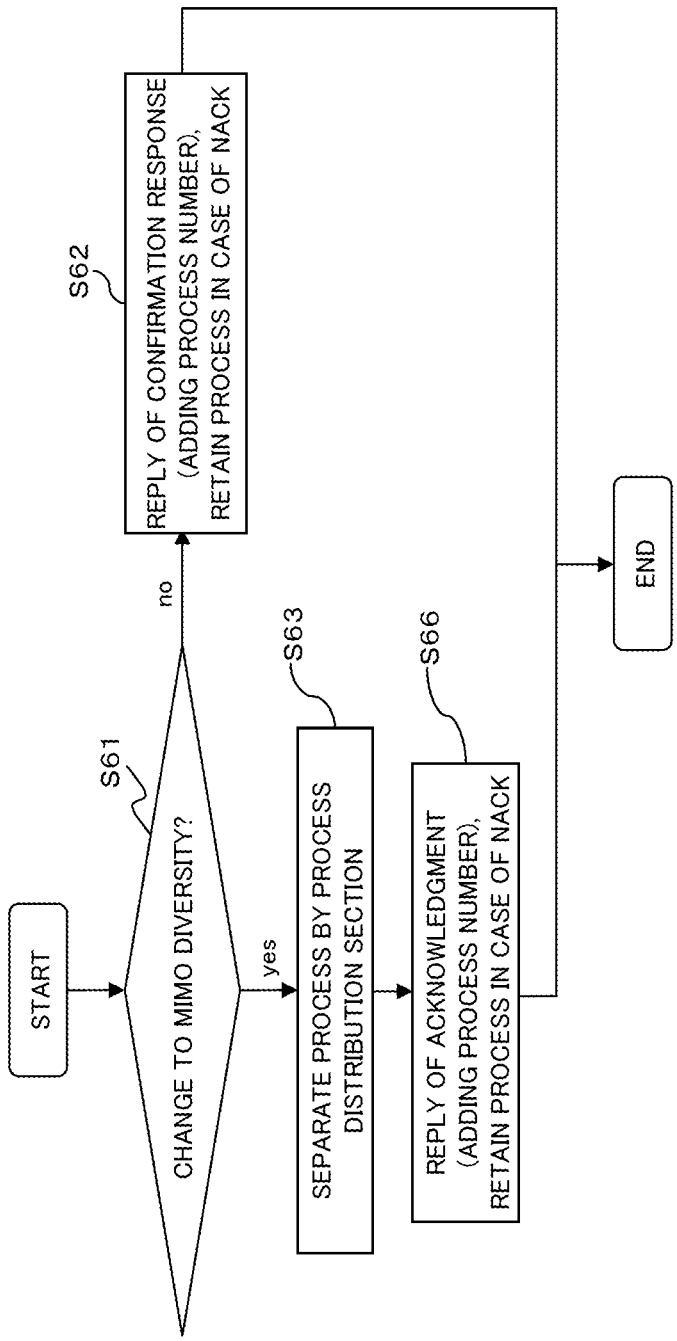
FIG. 14 is a flow chart illustrating operation (case 2) of the receiver apparatus in the MIMO transmission system depicted in FIG. 9.

(Case 2) Where ACK/NACK Signal is Sent as Reply with Process Number Added Explicitly (FIG. 14)

Even if a transmission mode changeover (change to the MIMO diversity transmission) occurs (refer to reference numeral 500 in FIG. 11), the receiver apparatus 2 sends the ACK/NACK as a reply with a process number added explicitly. For example, if attention is paid to the process "4" in FIG. 11 sent from the antenna system Tx#1 (the main antenna system is Tx#2) of the sender apparatus 1 after occurrence of the transmission mode changeover, then the receiver apparatus 2 produces, as an acknowledgement signal with regard to the process "4", a signal to which the process number of the received process "4" is added by means of the ACK/NACK decision section 24 and sends the acknowledgement signal as a reply to the sender apparatus 1.

Consequently, the sender apparatus 1 can identify a reply to which process of which antenna system Tx#i (in the present example, a reply to the process "4") the acknowledgement signal is by means of the re-sending controlling section 16. Thus, the sender apparatus 1 can re-send the process "4" correctly from the main antenna system Tx#2 without re-sending the process "5" in error.

It is to be noted that, also in the present case 2, although the sender apparatus 1 can transmit a process only from the main antenna system if a certain time period (T) elapses after occurrence of a transmission mode changeover, after lapse of the T time period, the sender apparatus 2 cannot send a process with a process number omitted. In the present case 2, even if the certain time period (T) elapses after occurrence of a transmission mode changeover and the sender apparatus thereafter transmits a process only from the main antenna system, since, different from the case 1, timing synchronism is not established, it is necessary to send an acknowledgement with a process number added.

FIG. 14 illustrates an operation flow chart of the receiver apparatus 2 in the present case 2.

In particular, the receiver apparatus 2 monitors and decides whether or not a transmission mode changeover (change to the MIMO diversity transmission) occurs (step S61), and if a transmission mode changeover does not occur (in case of no at step S61), then the ACK/NACK decision section 24 produces an acknowledgement signal with a received process number added and transmits the produced acknowledgement signal to the sender apparatus 1. Further, where the acknowledgement signal is the NACK signal, the HARQ reception processing section 22 retains the received process in preparation for re-sending synthesis (step S62).

On the other hand, if a transmission mode changeover occurs (in case of yes at step S61), then the process distribution section 26A carries out separation of a received process (identification of the access number) (step S63) and produces and sends an acknowledgement signal with the received process number added as a reply to the sender apparatus 1 irrespective of whether or not the T time period elapses. Further, if the acknowledgement signal is the NACK signal, then the HARQ reception processing section 22 retains the received process in preparation for re-sending synthesis (step S66).

In this manner, in the present case 2, as far as a transmission mode changeover (change to the MIMO diversity transmission) occurs and it is necessary to identify each transmission process among the antenna systems Tx#i (Rx#i), an acknowledgement signal to which the received process number is added is sent as a reply to the sender apparatus 1. Therefore, even if the sender apparatus 1 is not in a synchronized state with the receiver apparatus 2 in regard to the sending timing of an acknowledgement signal to a sending process, the sender apparatus 1 can correctly identify a process to be re-sent and can suppress re-sending in error of a re-sending process with certainty.

[C] Description of Third Embodiment

The first and second embodiments described above demonstrate that, by setting an addition method of a process number such that a process number may not be competitive between antenna system, also when the transmission mode changes over from the MIMO multiplex transmission to non-MIMO multiplex transmission, correct synthesis of processes can be achieved and transmission of streams can be continued without interruption while preventing re-sending in error of a process. However, the present embodiment demonstrates a technique of continuing communication without interruption of stream transmission also in conventional PARC or precoding wherein a process number is added to a transmission stream independently for each antenna system.

In the present embodiment, attention is paid to the fact that, originally upon occurrence of a transmission mode changeover, re-sending in error is caused by the fact that a process remains in an antenna system other than the main antenna system. Therefore, in order to prevent re-sending in error, when the transmission mode changes over from the MIMO multiplex transmission, for example, to the MIMO diversity transmission, the timing of the changeover (reduction control of the stream number) is delayed in response to the process (non-sent process) amount remaining in the antenna systems other than the main antenna system (for example, the changeover is carried out after transmission of all of the remaining processes ends).

Figure 15:
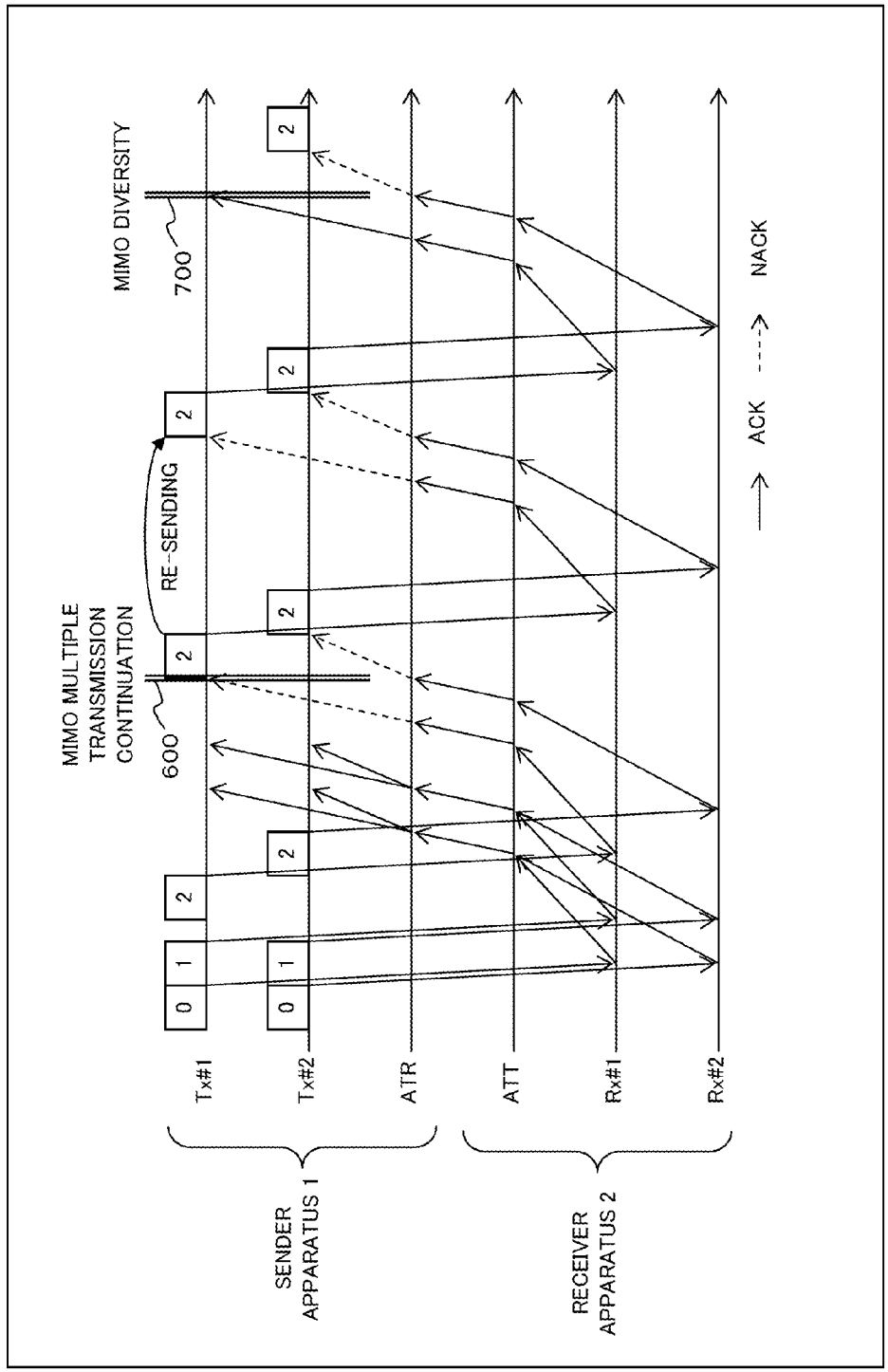
FIG. 15 is a view illustrating re-sending process operation in a MIMO transmission system according to a third embodiment of the present invention.
Figure 26:
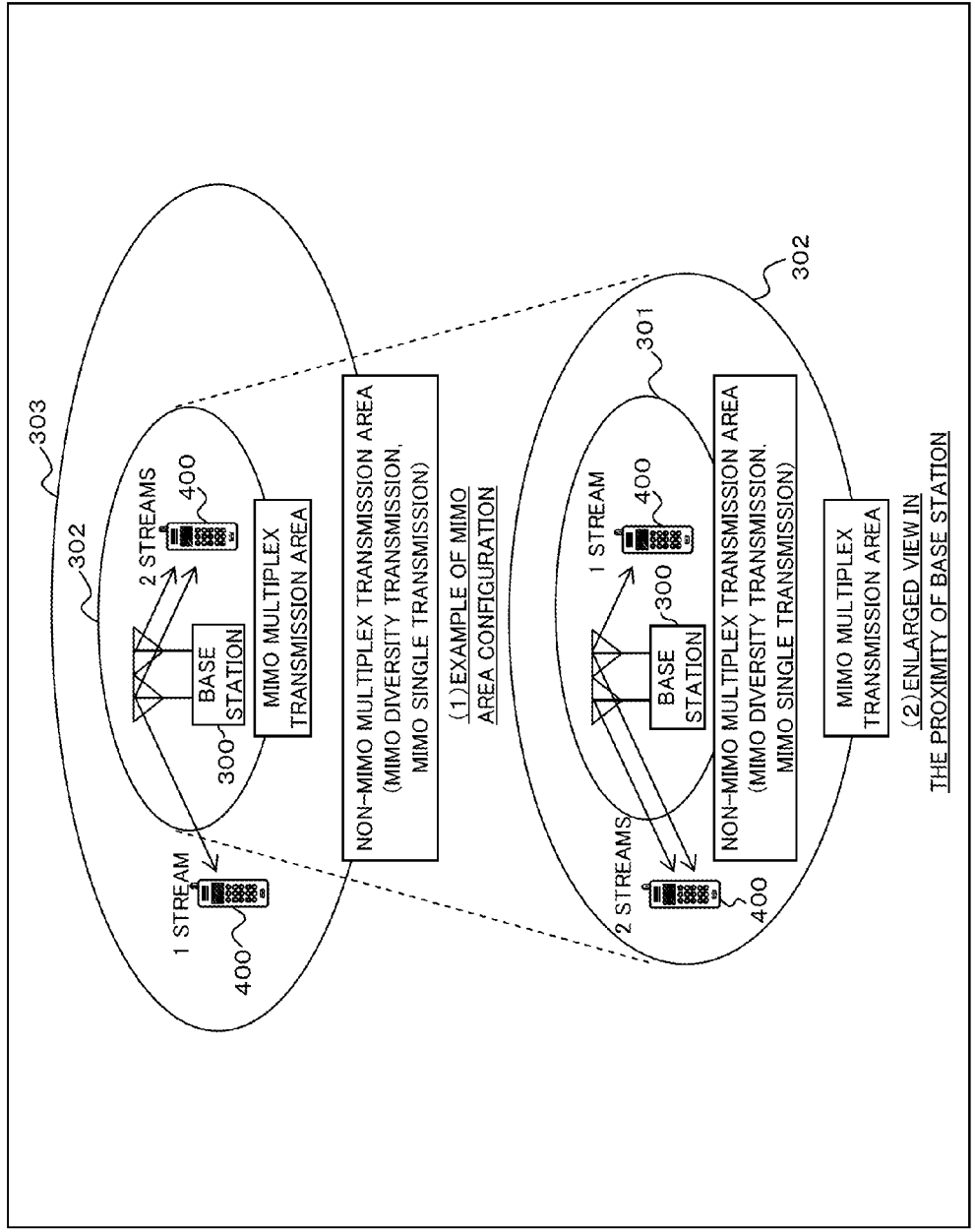
FIG. 26 is a block diagram depicting an example of a cell configuration of the MIMO transmission system.
Figure 27:
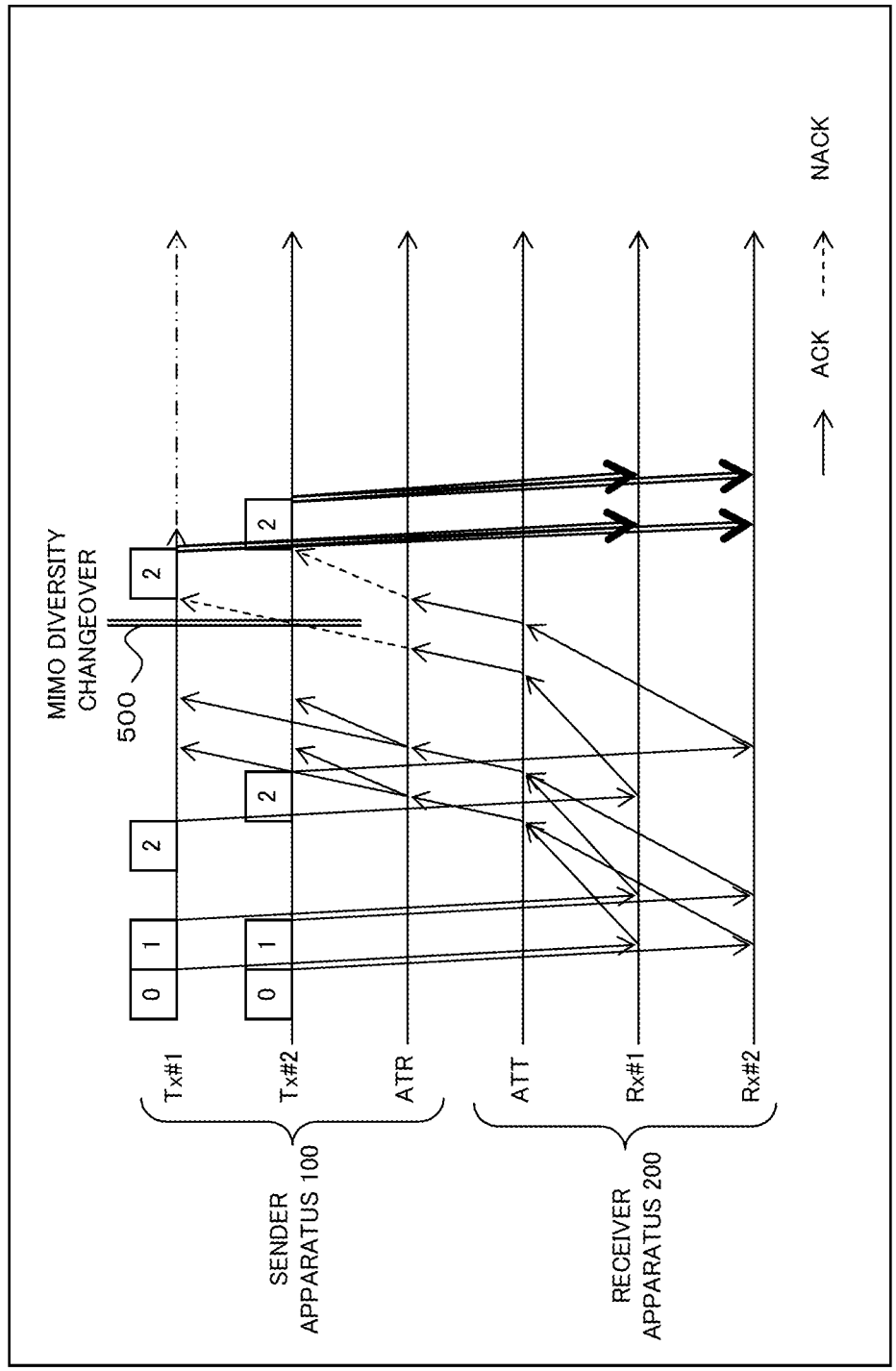
FIG. 27 is a view illustrating an example of operation where the transmission mode is changed over from MIMO multiplex transmission to MIMO diversity transmission in the PARC.
Figure 28:
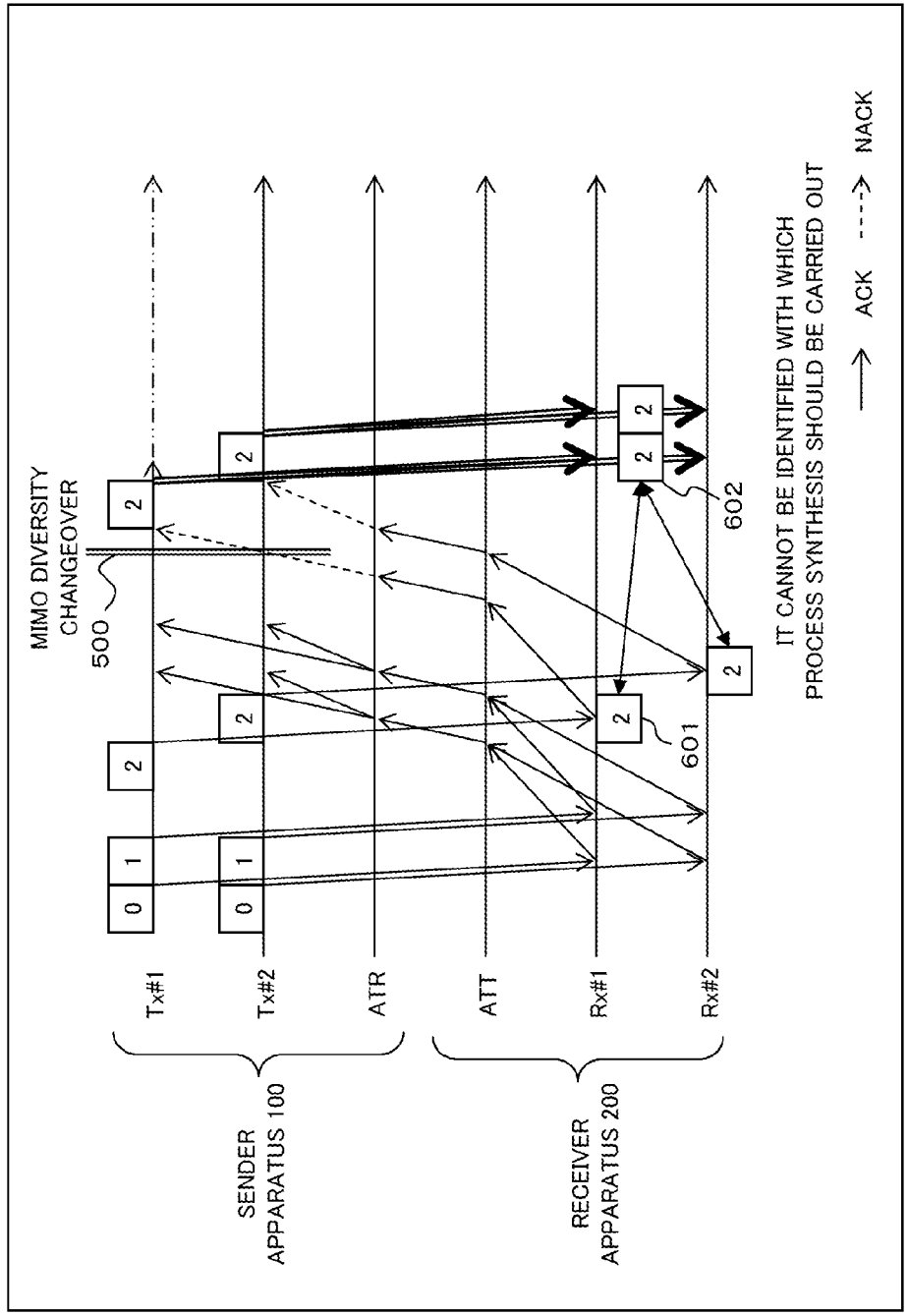
FIG. 28 is a view illustrating a subject of the prior art.
Figure 29:
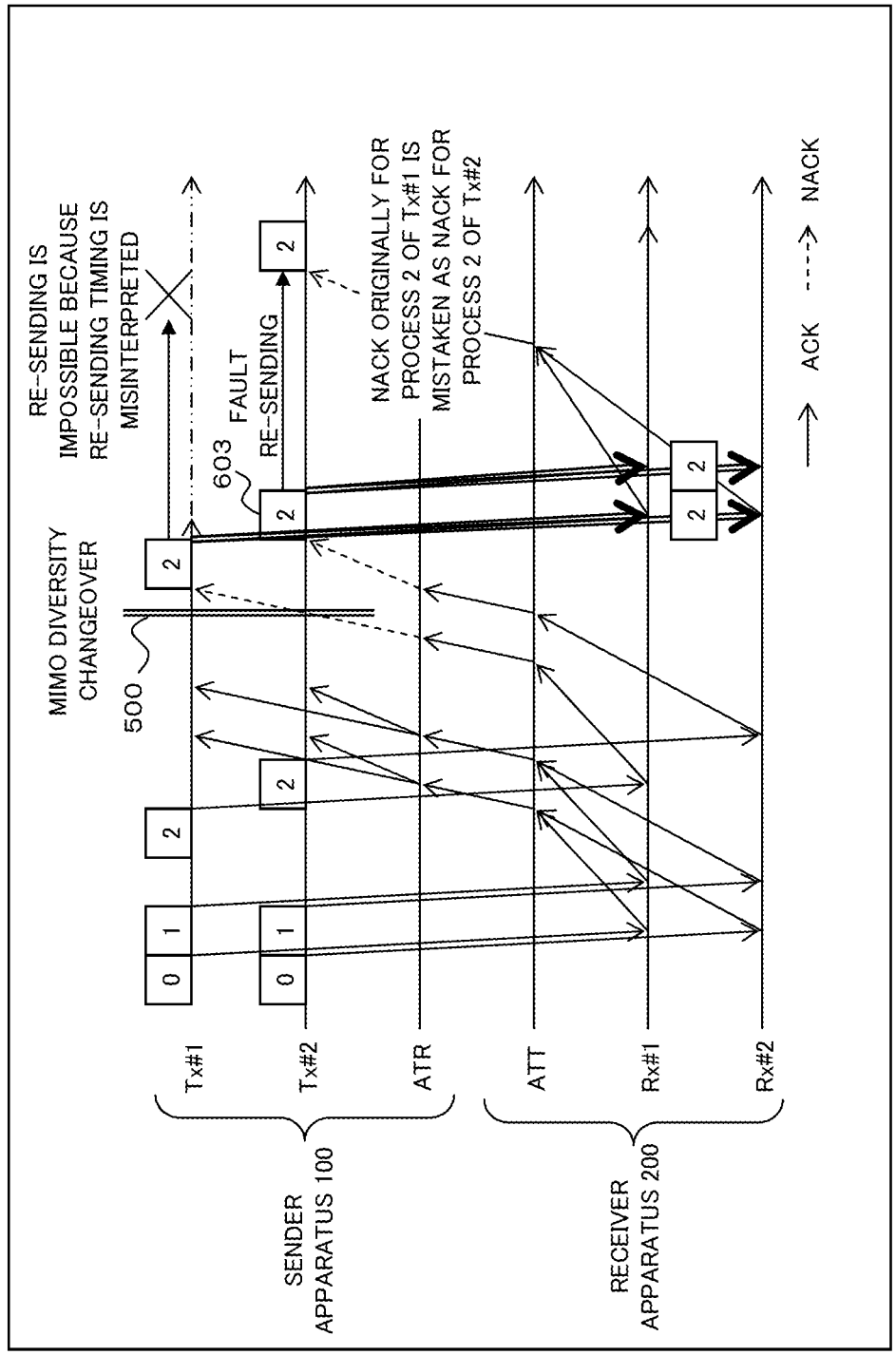
FIG. 29 is a view illustrating another subject of the prior art.
Figure 30:
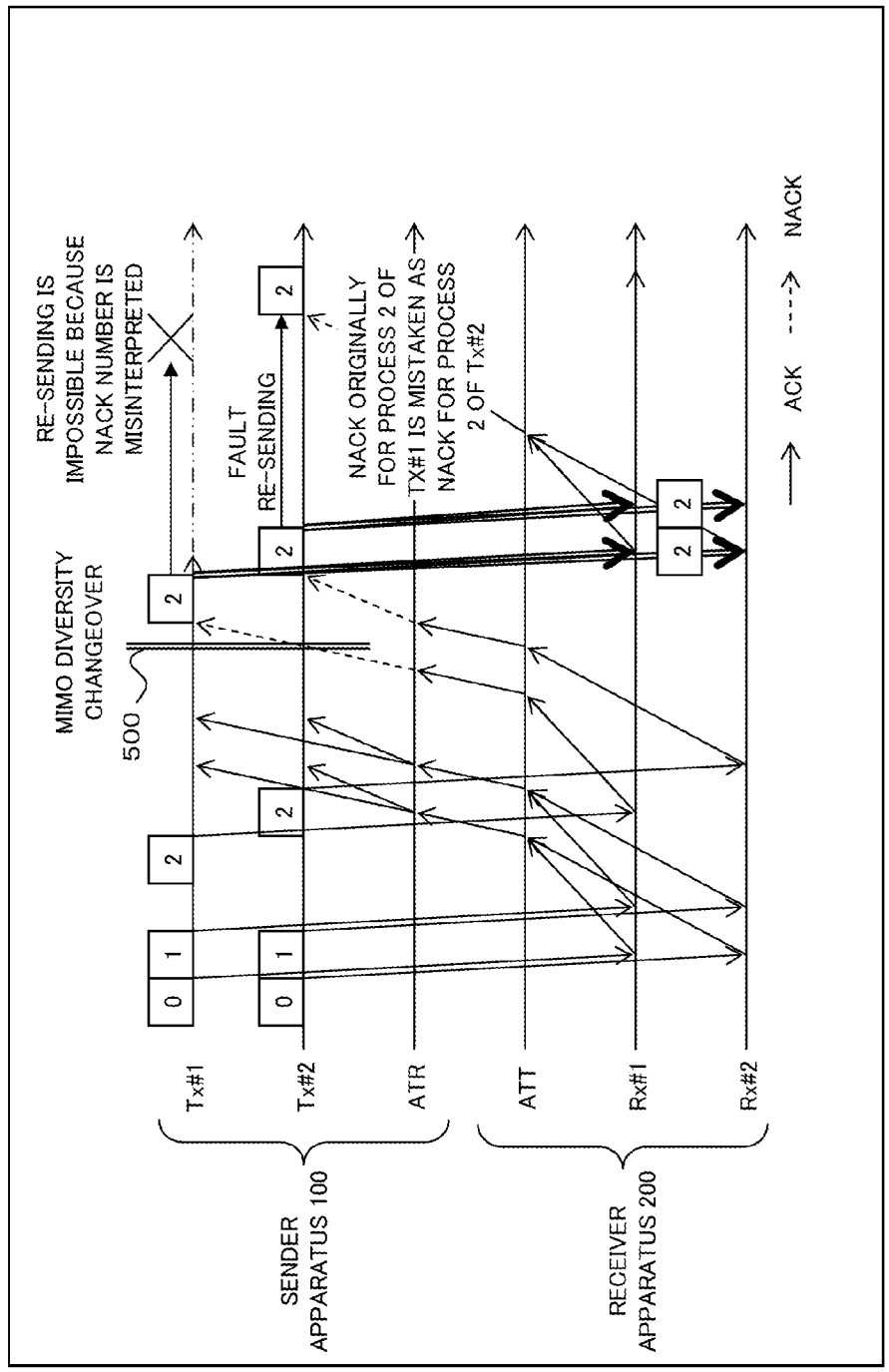
FIG. 30 is a view illustrating a further subject of the prior art.
Figure 31:
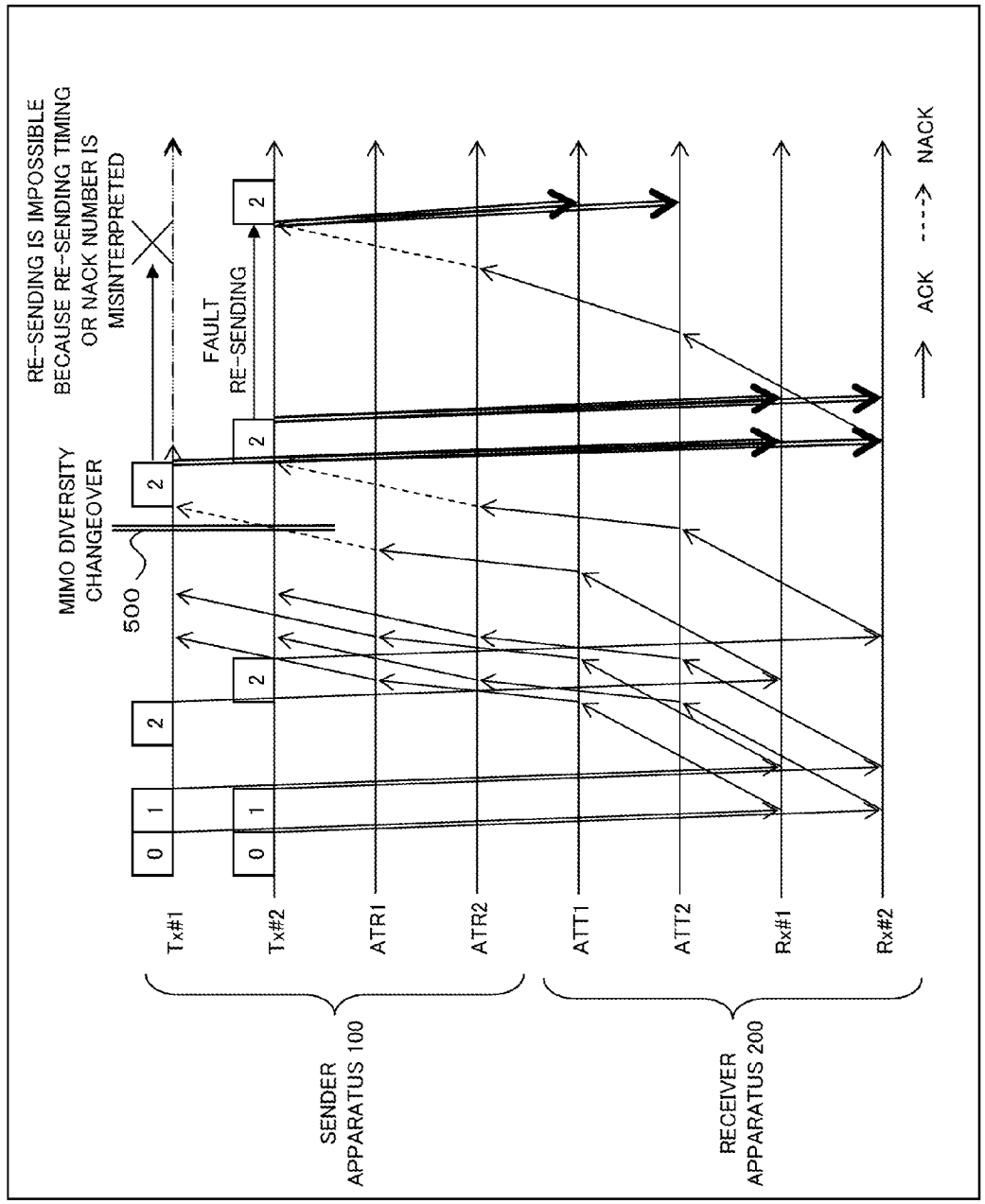
FIG. 31 is a view illustrating a still further subject of the prior art.
Figure 32:
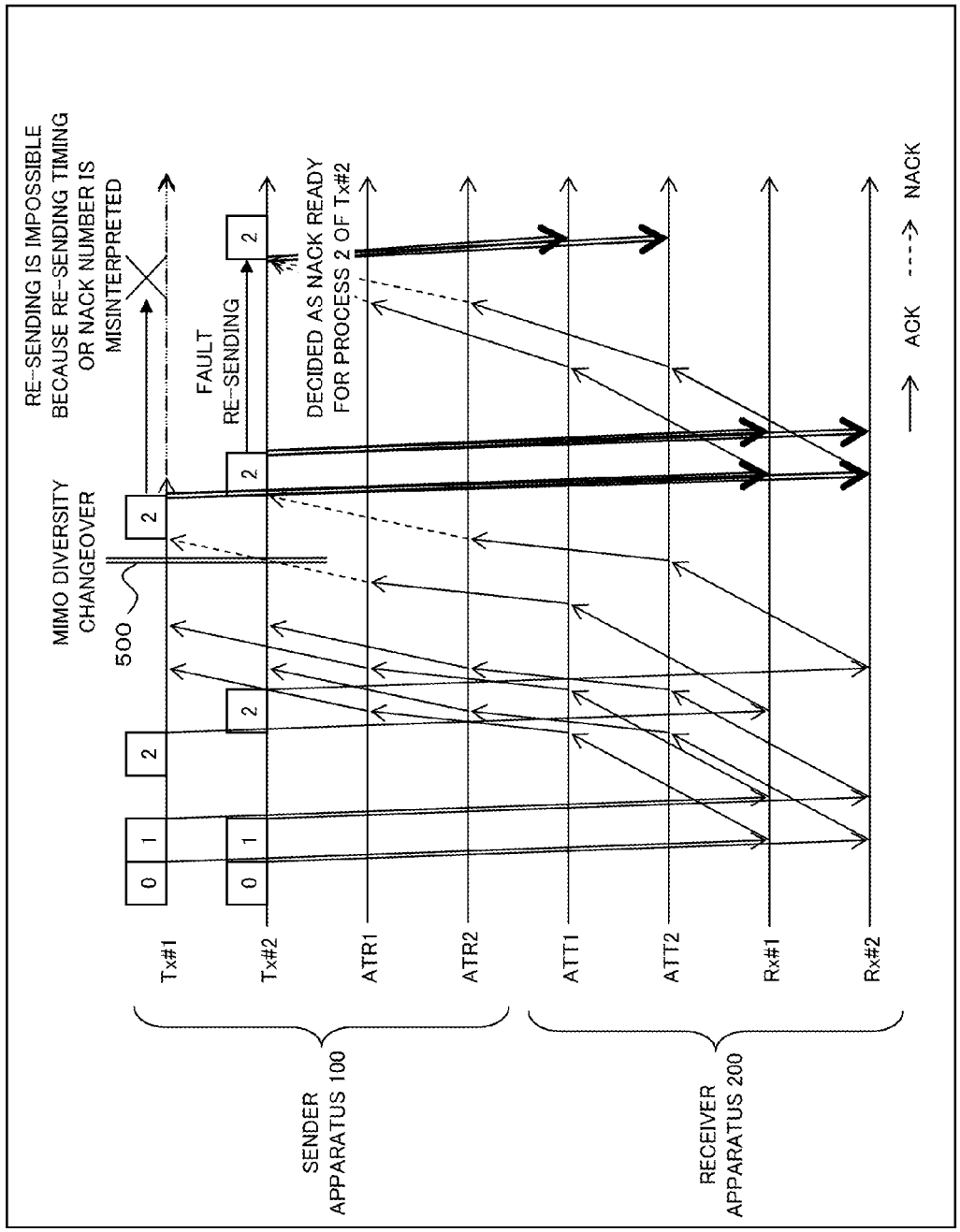
FIG. 32 is a view illustrating a yet further subject of the prior art.

FIG. 15 illustrates a manner of communication between the sender apparatus 1 and the receiver apparatus 2 where this method is applied. In FIGS. 5, 7 and 11, if movement of the receiver apparatus 2 from a MIMO multiplex transmission area 302 (refer to FIG. 26) to another non-MIMO multiplex transmission area (MIMO diversity area) 301 or 303 is detected, then the sender apparatus immediately carries out changeover to the MIMO diversity transmission (refer to reference numeral 500).

On the other hand, in FIG. 15, even if the movement (area change) is detected at a timing indicated by reference numeral 600, since the remaining process "2" exists for the antenna system Tx#1 at this point of time, the sender apparatus 1 continues the MIMO multiplex transmission, but the sender apparatus 1 actually changes over the transmission mode from the MIMO multiplex transmission to the MIMO diversity transmission only after the transmission of the remaining process "2" ends (for example, at a timing indicated by reference numeral 700). Consequently, even if such a special process number addition method as in the first embodiment or the second embodiment is not applied, communication can be continued by simple and easy control without interruption of stream transmission upon occurrence of a mode changeover.

Figure 16:
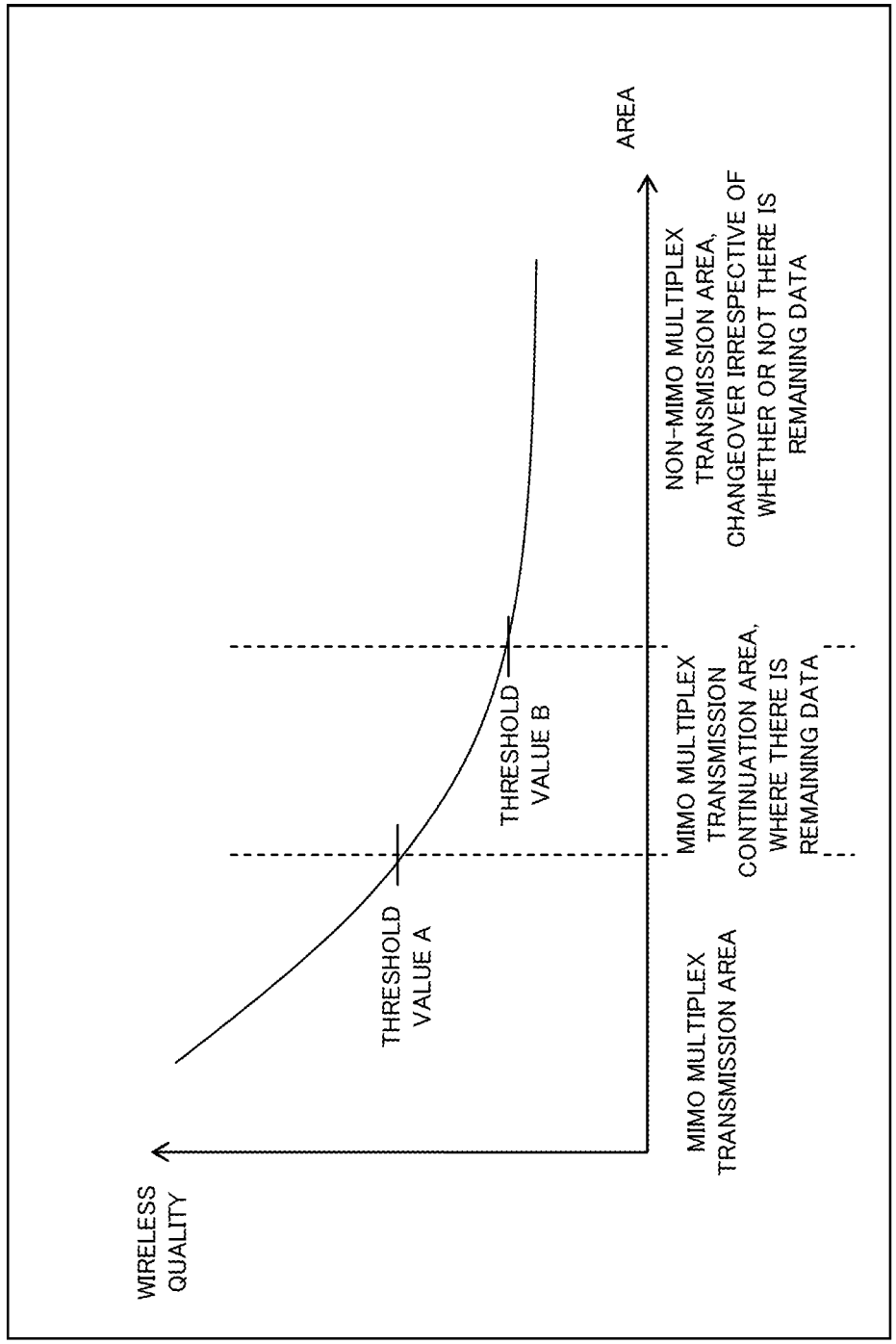
FIG. 16 is a view illustrating a MIMO transmission changeover method according to the third embodiment.

It is to be noted, however, that, with the present method, the transmission mode cannot be changed over to the MIMO diversity until after re-sending of the remaining process "2" is completed successfully. Therefore, for example, as illustrated in FIG. 16, separately from the changeover threshold value for the MIMO diversity transmission (threshold value A for the wireless quality), a threshold value for changing over the transmission mode to the MIMO diversity even if a remaining process exists (threshold value B regarding the wireless quality<A) is provided. Then, where the wireless quality of the receiver apparatus (mobile station) 2 has a value between the threshold value A and the threshold value B, if a remaining process exists, then the sender apparatus 1 continues the MIMO multiplex transmission, but where the wireless quality is lower than the threshold value B, the sender apparatus changes over the transmission mode to the MIMO diversity transmission.

It is to be noted that the function described above can be incorporated, for example, as one function of the re-sending controlling section 16 described hereinabove and also can be incorporated as an individual controlling section (transmission mode changeover timing controlling section). Further, it is possible to allow the sender apparatus 1 to grasp the wireless quality of the receiver apparatus 2 making use of a known method such as, for example, a method of feeding back reception quality information such as the SIR, CQI or the like measured by the receiver apparatus (this similarly applies also in the following description).

[D] Description of Fourth Embodiment

Here, a different method of continuing stream transmission without interruption even in the conventional PARC wherein a process number is applied to a sending stream independently for each antenna system is described.

Also in the present embodiment 4, attention is paid to the fact that, upon occurrence of a transmission mode changeover, re-sending in error is caused by the fact that a process remains in an antenna system other than the main antenna system similarly as in the third embodiment. In particular, when, upon mode changeover from the MIMO multiplex transmission to non-MIMO multiplex transmission (MIMO diversity transmission), where, although the wireless quality of the receiver apparatus 2 is higher than a threshold value for changeover (threshold value A), it is lower than another threshold value (threshold value C) (that is, the threshold value C>threshold value A>threshold value B) and besides sending data (process) does not exist in the antenna system other than the main antenna system, the sender apparatus 1 does not wait that the wireless quality becomes lower than the threshold value A but changes over the transmission mode to the MIMO diversity transmission at a later point of time.

Figure 17:
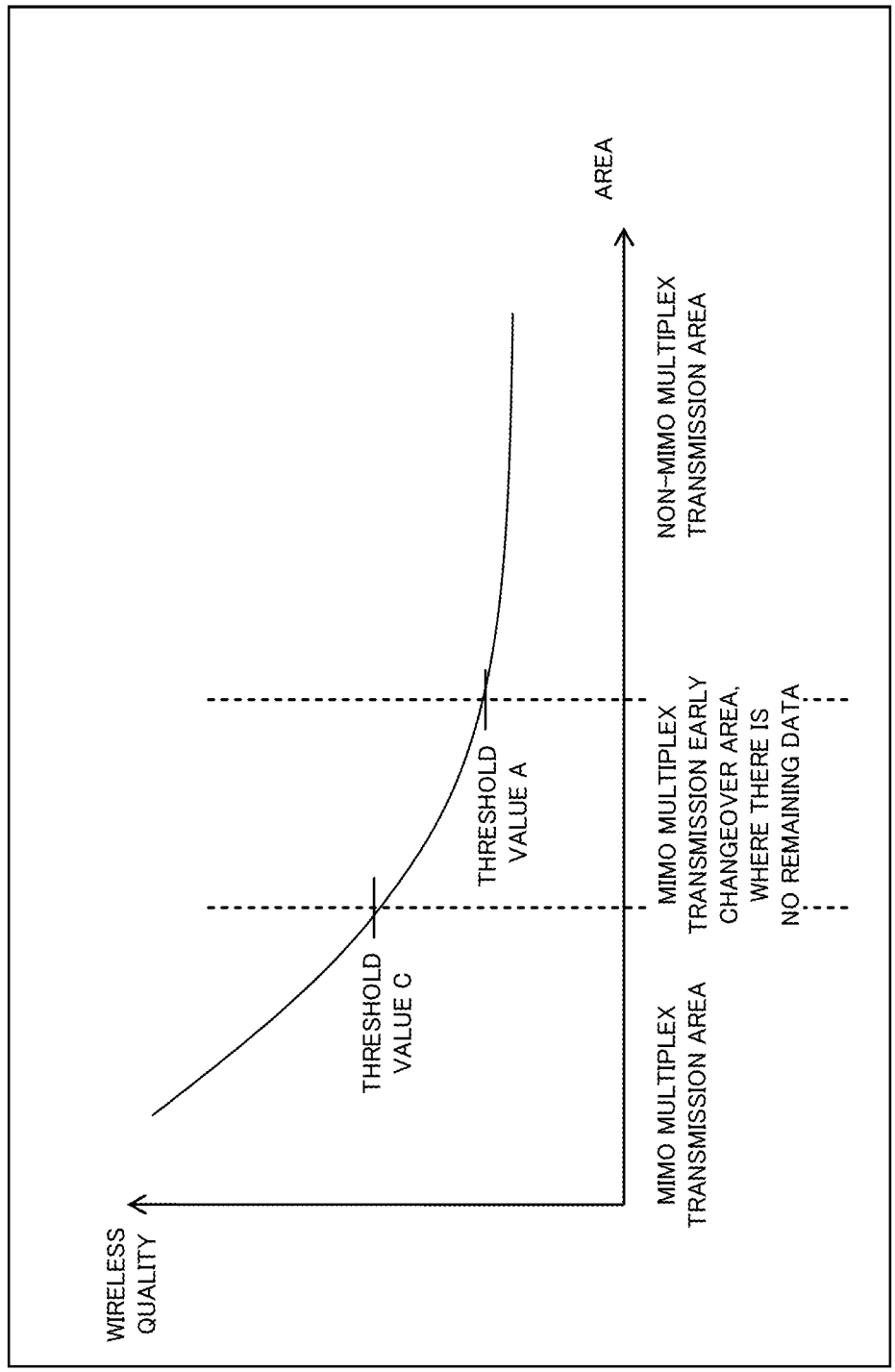
FIG. 17 is a view illustrating a MIMO transmission changeover method according to a fourth embodiment of the present invention.

FIG. 17 illustrates an example of setting of the threshold values A and C. Meanwhile, FIG. 18 illustrates a manner of communication between the sender apparatus 1 and the receiver apparatus 2 where the method of the present embodiment is applied.

Figure 18:
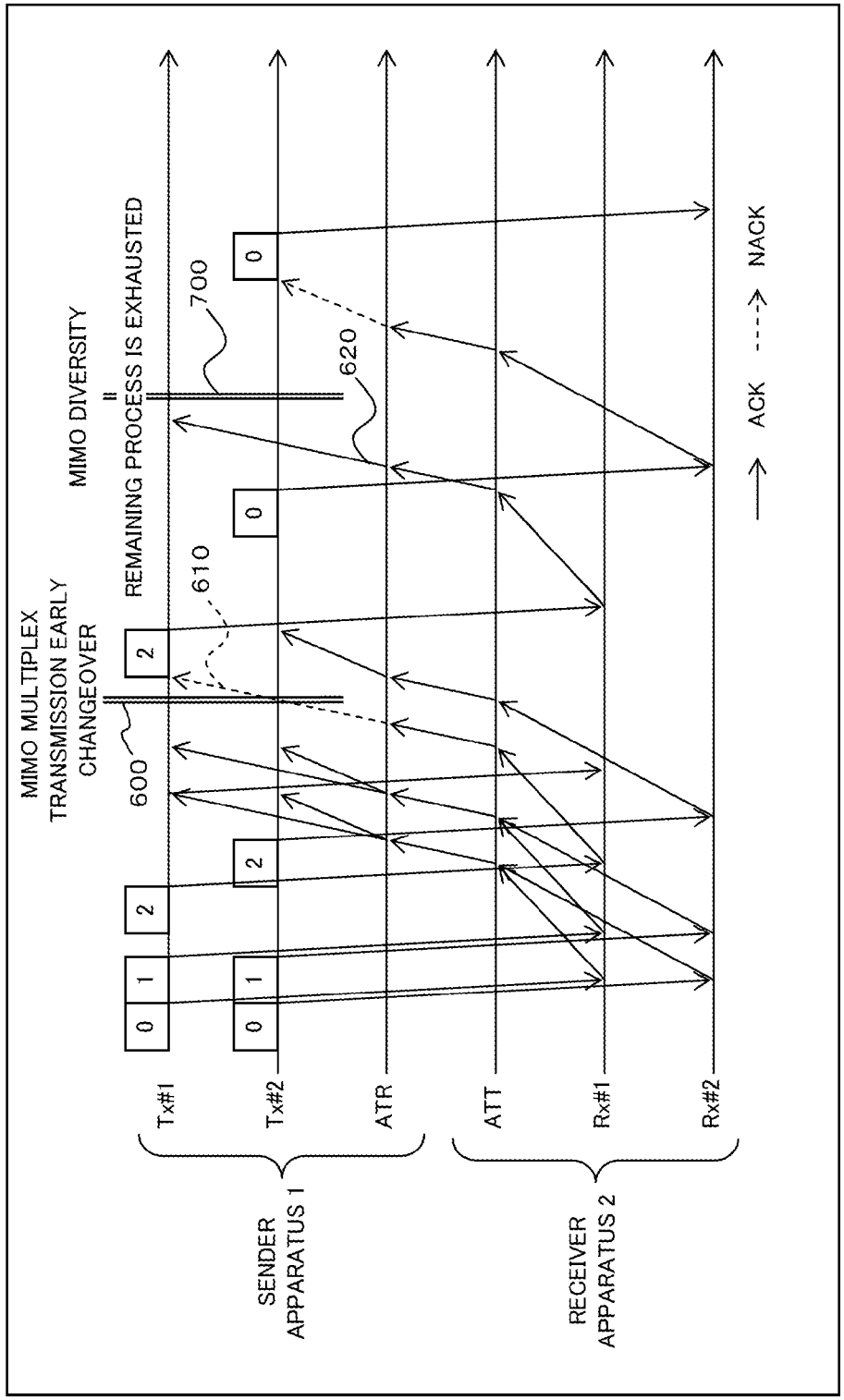
FIG. 18 is a view illustrating re-sending process operation in a MIMO transmission system according to the fourth embodiment.
Figure 19:
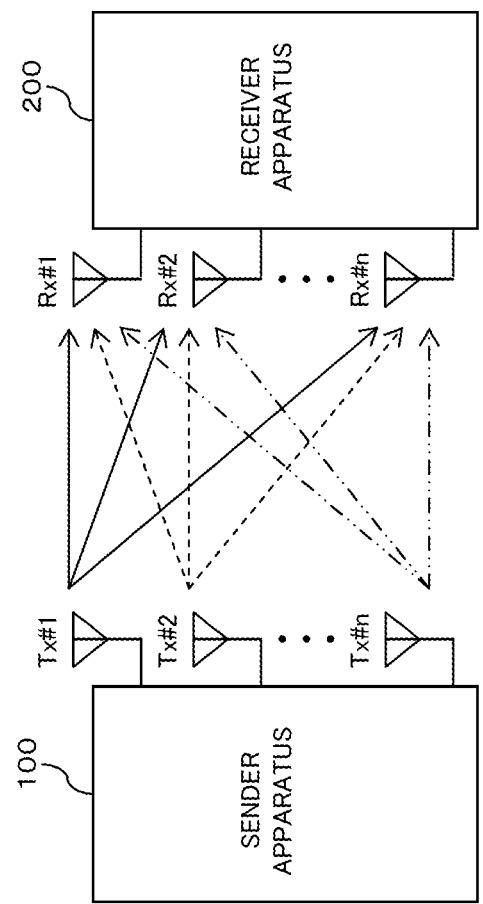
FIG. 19 is a schematic view of a MIMO transmission system.
Figure 20:
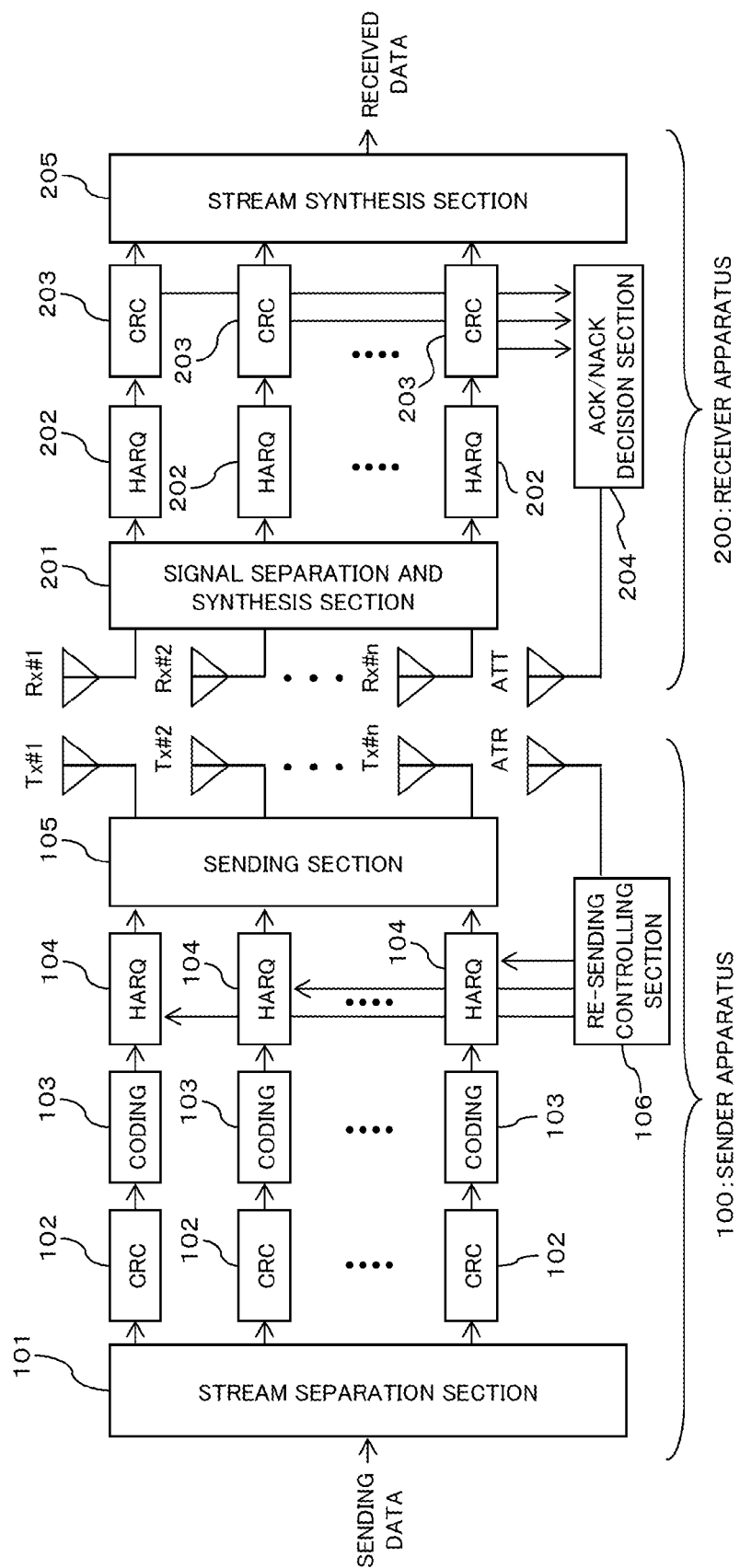
FIG. 20 is a block diagram depicting an example of a configuration of a sender apparatus and a receiver apparatus in the MIMO transmission system depicted in FIG. 19.
Figure 21:
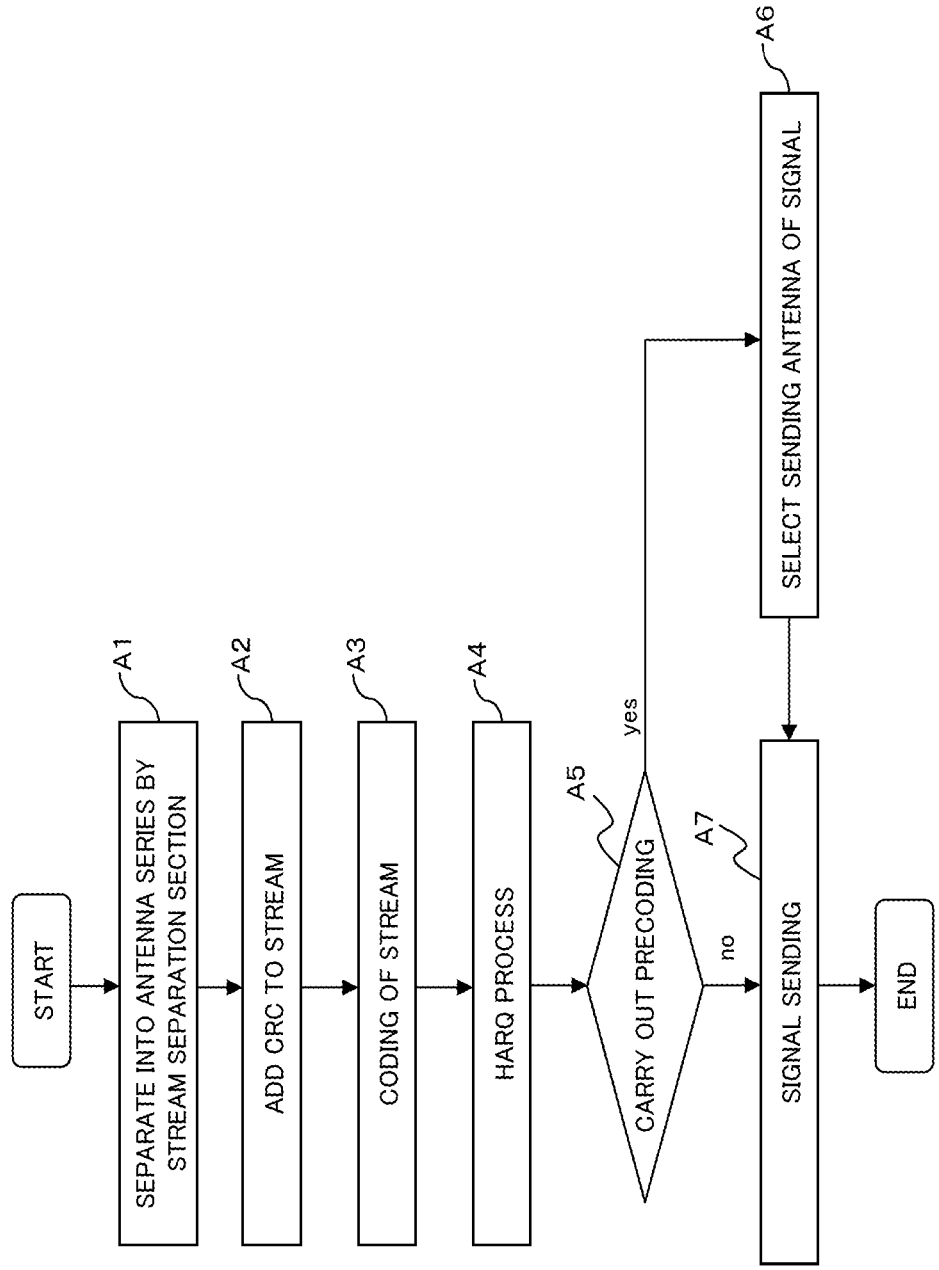
FIG. 21 is a flow chart illustrating operation of the sender apparatus in the MIMO transmission system depicted in FIG. 20.
Figure 22:
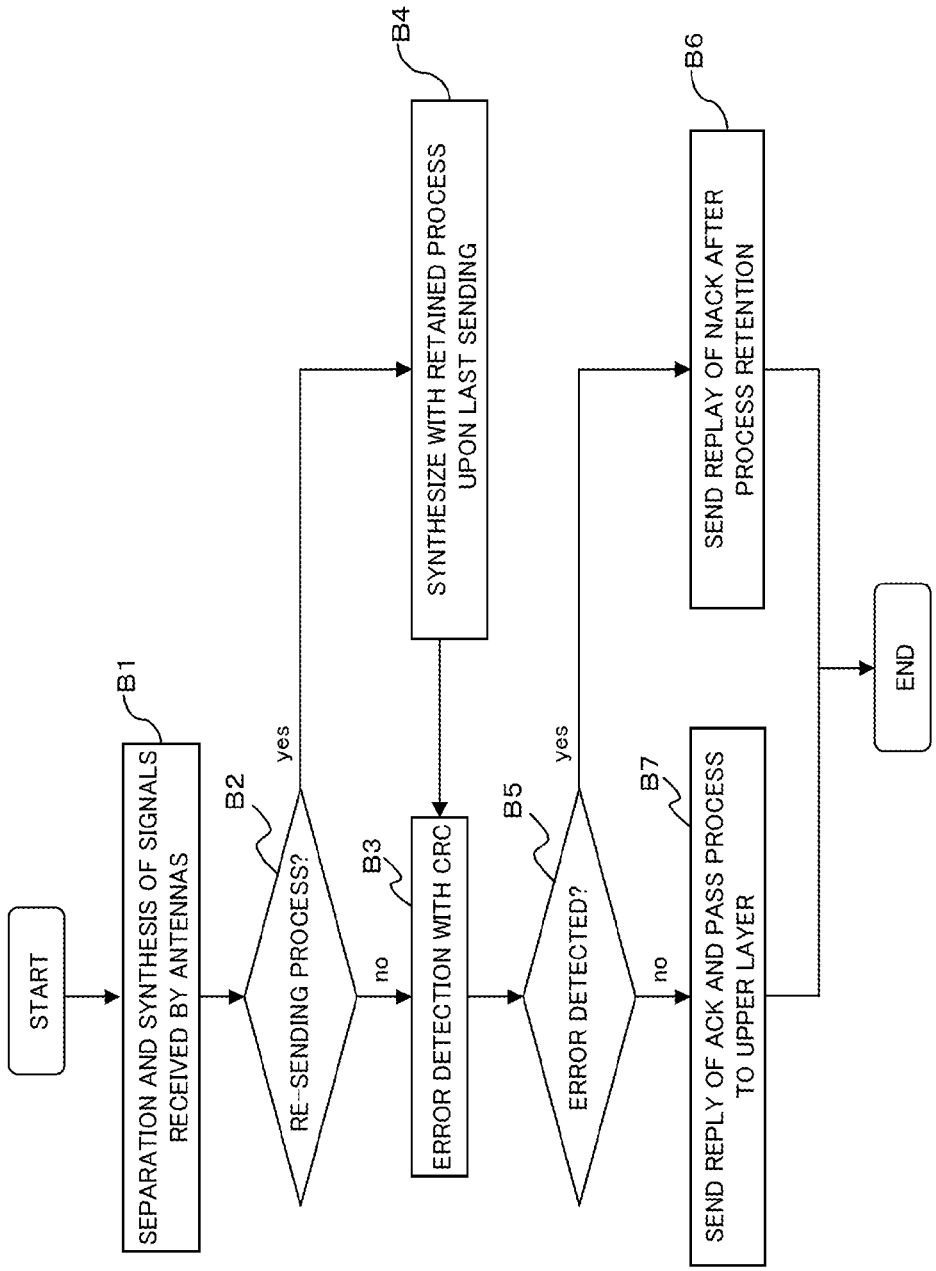
FIG. 22 is a flow chart illustrating operation of the receiver apparatus in the MIMO transmission system depicted in FIG. 20.
Figure 23:
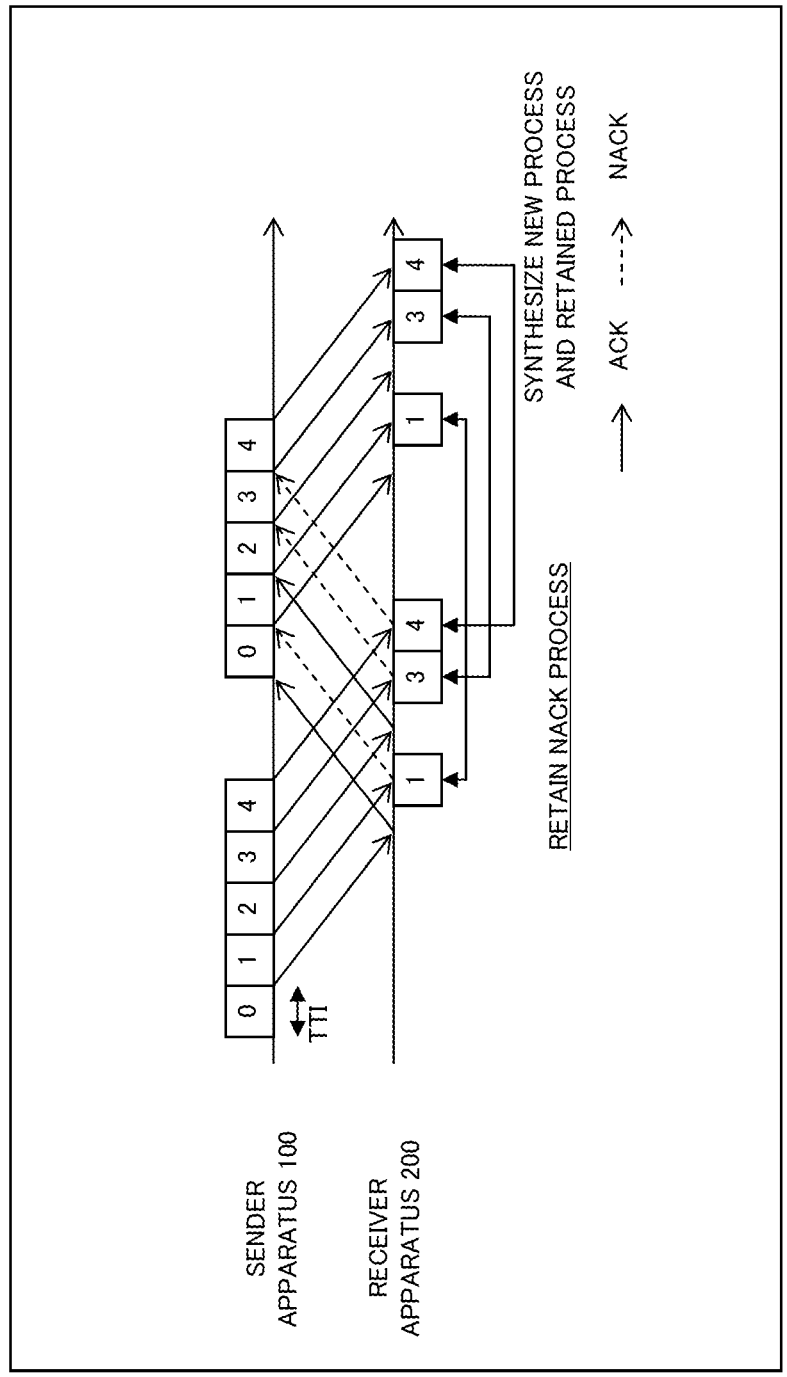
FIG. 23 is a view illustrating a re-sending synthesis process in the MIMO transmission system depicted in FIG. 20.
Figure 24:
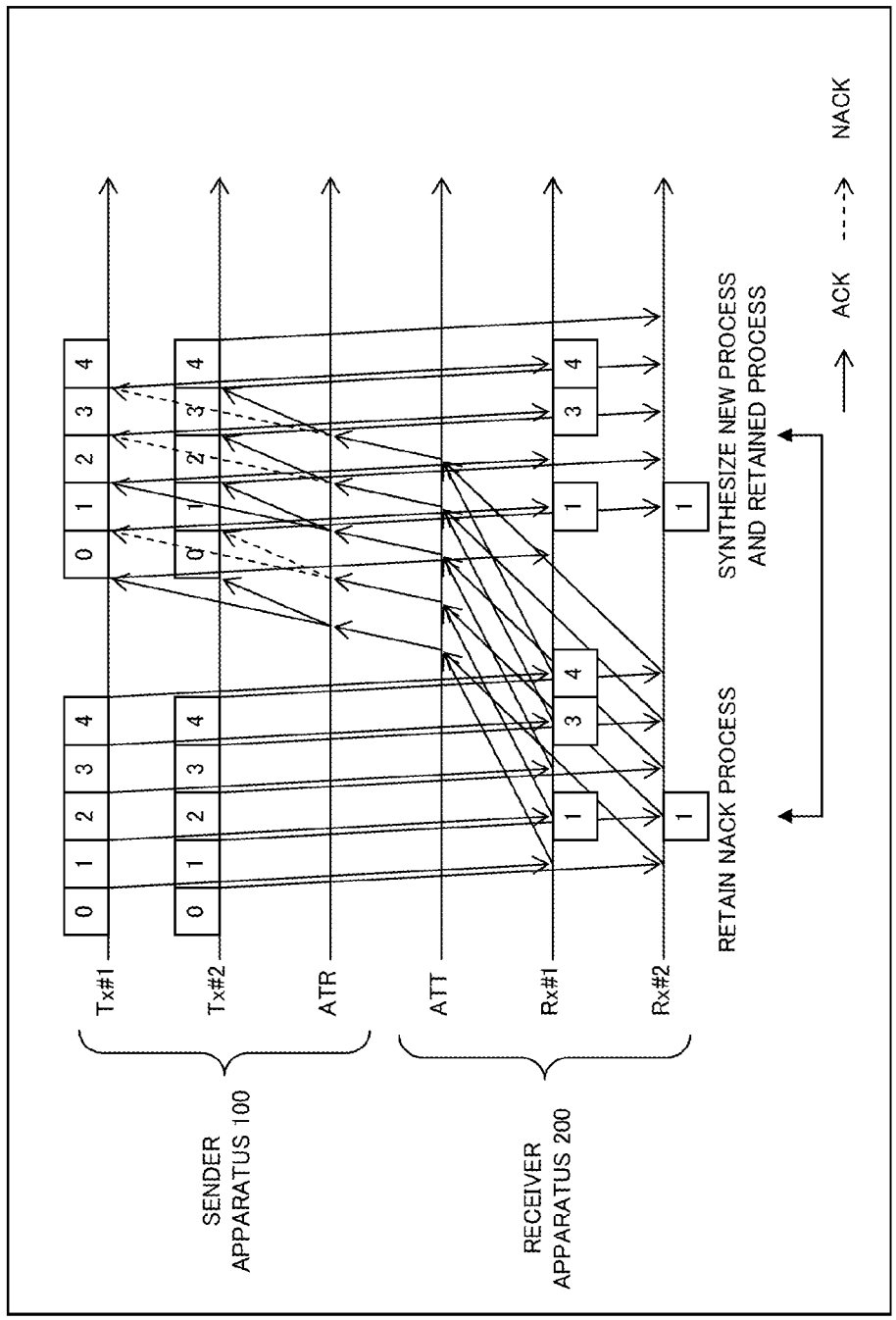
FIG. 24 is a view illustrating a manner of N-channel Stop-and-Wait ARQ where the sender apparatus and receiver apparatus in the MIMO transmission system depicted in FIG. 20 are ready for the PARC.
Figure 25:
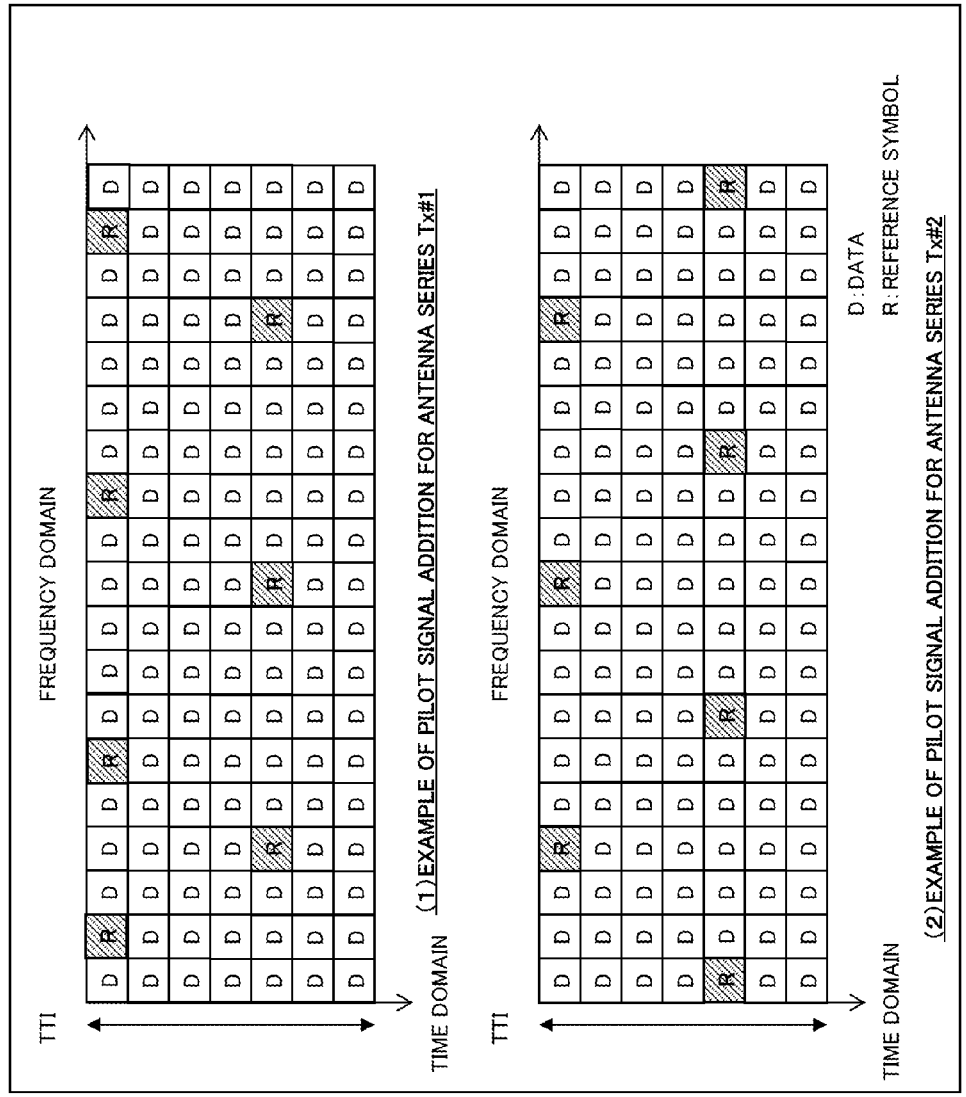
FIG. 25 is a view illustrating an example of pilot signal addition in the MIMO transmission system depicted in FIG. 20.

In FIG. 18, a manner is illustrated wherein, since the sender apparatus 1 receives a NACK signal (refer to a broken line arrow mark 610) with regard to the process "2" of the antenna system Tx#1 after movement of the receiver apparatus 2 from a MIMO multiplex transmission area to a non-MIMO multiplex transmission area (MIMO diversity area) is detected (refer to reference numeral 600), re-sending of the process "2" occurs and, immediately after an ACK signal (refer to a solid line arrow mark 620) to the re-sending process, all remaining processes of the antenna system Tx#1 are transmitted. If the wireless quality of the receiver apparatus 2 has a value between the threshold value A and the threshold value C after a point of time at which the remaining processes disappear in this manner, then the transmission mode can be changed over immediately to the MIMO diversity transmission at a timing indicated by reference numeral 700.

It is to be noted that also the function described above can be incorporated, for example, as one function of the re-sending controlling section 16 described hereinabove and also can be incorporated as an individual controlling section (transmission mode changeover timing controlling section). Further, the threshold value A, threshold value B and threshold value C described above may be set simultaneously as far as the relationship of the threshold value C>threshold value A>threshold value B is satisfied.

INDUSTRIAL APPLICABILITY

As described in detail above, according to the present invention, in a radio communication system, even where the number of transmission streams between a sender apparatus and a receiver apparatus varies (decreases), it is possible to maintain the matching property of a data block of a re-sending synthesis target to continue communication normally, and therefore, the radio communication system is very useful in the field of the radio communication technique.

What is claimed is:

1. A wireless communication system comprising:
a sender apparatus having a plurality of transmitting antennas that performs MIMO transmission of a plurality of data blocks; and
a receiver apparatus that receives the plurality of data blocks, wherein
the sender apparatus transmits a process number via a control channel different from a data channel to the receiver apparatus, the process number being based on a predetermined rule shared between the sender apparatus and the receiver apparatus, by which the process number4 is not competitive between the data blocks, and
when the MIMO diversity transmission is performed, the receiver apparatus performs HARQ processing of the received data blocks based on a received process number from the sender apparatus.

2. A wireless communication method for a wireless communication system including a sender apparatus having a plurality of transmitting antennas that performs MIMO transmission of a plurality of data blocks; and a receiver apparatus that receives the plurality of data blocks, the wireless communication method comprising:
on the sender apparatus,
transmitting a process number via a control channel different from a data channel to the receiver apparatus, the process number being based on a predetermined rule shared between the sender apparatus and the receiver apparatus, by which the process number is not competitive between the data blocks; and on the receiver apparatus, performing, when the MIMO diversity transmission is performed, HARQ processing of the received data blocks based on a received process number from the sender apparatus.

3. The wireless communication system according to claim 1, wherein the rule is defined in such a manner that the process number for each of the plurality of data blocks is determined to have an offset between a process number for a data block transmitted over a first transmission system and a process number for a data block transmitted over a second transmission system, the offset being determined depending on the number of HARQ processes.

4. The wireless communication method according to claim 2, wherein the rule is defined in such a manner that the process number for each of the plurality of data blocks is determined to have an offset between a process number for a data block transmitted over a first transmission system and a process number for a data block transmitted over a second transmission system, the offset being determined depending on the number of HARQ processes.

* * * * *

UNITED STATES PATENT AND TRADEMARK OFFICE
CERTIFICATE OF CORRECTION

| | | |
|---|---|---|
| PATENT NO. | : 9,094,201 B2 | Page 1 of 1 |
| APPLICATION NO. | : 13/741815 | |
| DATED | : July 28, 2015 | |
| INVENTOR(S) | : Ohta et al. | |

It is certified that error appears in the above-identified patent and that said Letters Patent is hereby corrected as shown below:

Column 26 line 41-56 claim 1,

1. A wireless communication system comprising: a sender apparatus having a plurality of transmitting antennas that performs MIMO transmission of a plurality of data blocks; and a receiver apparatus that receives the plurality of data blocks, wherein the sender apparatus transmits a process number via a control channel different from a data channel to the receiver apparatus, the process number being based on a predetermined rule shared between the sender apparatus and the receiver apparatus, by which the process number4 is not competitive between the data blocks, and when the MIMO diversity transmission is performed, the receiver apparatus performs HARQ processing of the received data blocks based on a received process number from the sender apparatus.

Should read

1. A wireless communication system comprising: a sender apparatus having a plurality of transmitting antennas that performs MIMO transmission of a plurality of data blocks; and a receiver apparatus that receives the plurality of data blocks, wherein the sender apparatus transmits a process number via a control channel different from a data channel to the receiver apparatus, the process number being based on a predetermined rule shared between the sender apparatus and the receiver apparatus, by which the process number is not competitive between the data blocks, and when the MIMO diversity transmission is performed, the receiver apparatus performs HARQ processing of the received data blocks based on a received process number from the sender apparatus.

Signed and Sealed this
Nineteenth Day of January, 2016

Michelle K. Lee
*Director of the United States Patent and Trademark Office*